(12) United States Patent
Smith et al.

(10) Patent No.: US 6,591,614 B2
(45) Date of Patent: Jul. 15, 2003

(54) KINETIC COOLING AND HEATING

(76) Inventors: David C. Smith, 44 Candlelight Dr., Glastonbury, CT (US) 06033; Melvin P. Williams, 85 Butternut Rd., Manchester, CT (US) 06040

( * ) Notice: Subject to any disclaimer, the term of this patent is extended or adjusted under 35 U.S.C. 154(b) by 40 days.

(21) Appl. No.: 09/847,489

(22) Filed: May 2, 2001

(65) Prior Publication Data

US 2003/0024253 A1 Feb. 6, 2003

(51) Int. Cl.[7] ............................. F25B 21/00; F25D 9/00
(52) U.S. Cl. ............................................. 62/3.1; 62/467
(58) Field of Search ........................... 62/3.1, 467, 498, 62/401

(56) References Cited

U.S. PATENT DOCUMENTS 5,626,020 A * 5/1997 Sangster et al. ............... 62/3.1
6,282,894 B1 * 9/2001 Smith ............................ 60/509

OTHER PUBLICATIONS

N, Dd Eu et al; Laser Cooling by Spontaneous Anti–Stokes Scattering; Physical Review Letters Jan. 1981 p 236–p 239.*
Hansch et al; Cooling Gases by Laser Radiation; Optics Communications Jan. 1975, p. 68, 69.*
Gebhart, F. G. & Smith, D.C "Kinetic Cooling of a Gas by Absorption of $CO_2$ Laser Radiation" Appl. Phys. Lett., vol. 20, No. 3 Feb. 1, 1972.
King, B.E. "Laser Cooling" Nist Ion Storage Group (www.boulder.nist.gov) Feb. 1, 1997.
"Optical Cooling of Solids" Los Alamos National Laboratory (nis–www.lanl.gov) Feb. 25, 2000.

* cited by examiner

Primary Examiner—William Wayner
(74) Attorney, Agent, or Firm—C. G. Nessler

(57) ABSTRACT

In heating and cooling apparatus, molecules of working gas are excited by light irradiation and thereby cooled as the gas flows through a mirrored cooling cell. In a closed loop embodiment, the gas then flows by means of a fan or compressor to a first heat exchanger where heat from the matter being cooled is transferred to the gas; and, then to a second heat exchanger where heat is transferred from the gas to a heat sink. The apparatus may be used either like a heat pump or air conditioner. In an open-end cooling apparatus embodiment, the gas flows from the cooling cell, through the first heat exchanger, and to atmosphere. The light source may be a 10.6 micron laser; or a 9–11 micron electric arc, a hot filament or the Sun. Working gases comprise $N_2$ and $CO_2$; exhaust gases of engines or fuel cells; and gases which comprise different molecular composition gases or different isotopic species of the same molecular composition gas.

73 Claims, 10 Drawing Sheets

KINETIC COOLING AND HEATING

TECHNICAL FIELD

The present invention relates to refrigeration and heating, more particularly to closed and open loop refrigeration and heat pump systems which employ kinetic cooling of the working substance.

BACKGROUND

There is widespread use of mechanical refrigeration systems of the type which employ working fluid, or refrigerant, running in a closed loop. In a very common compression system, fluid, such as ammonia or Freon-12™ dichlorofluoromethane gas is compressed, essentially adiabatically. The fluid is then cooled in a cooling coil, or condenser, so the heat of compression is discharged to a waste heat reservoir or sink, and the refrigerant is liquefied. The refrigerant is then expanded, as by passing it through an orifice or expansion valve connected to a lower pressure region. Thus, the refrigerant gas is cooled by the Joule-Thompson effect, as the liquid refrigerant is vaporized; and, it is then passed through a cooling coil, or evaporator, which is located in the region which is to be cooled. The refrigerant absorbs heat from the region. It is then flowed back to the compressor.

The thermodynamic cycle of such a typical system is commonly characterized as a reversed Brayton cycle. The compressor, which may be of any of a variety of mechanical types, is typically driven by an electric or other kind of motor.

A less common refrigeration system is the absorption type, founded on Dalton's law of partial pressure of gas mixtures. An absorption system has similar elements to the compression system, but the compressor is replaced by a heater and generator. The refrigerant is a special combination of two gases, such as ammonia and hydrogen or lithium bromide and water. In the generator, heat causes differential separation of one gas from the other. Heat sources can be flames or a radiant source, such as solar energy. Such kinds of systems have tended to find use in locales where a reliable central source of electricity for motors is not available.

A disadvantage of the common prior art systems is that the refrigerants have qualities which are either noxious or environmentally disfavored. Another disadvantage is compressor noise and eventual wear when comparatively high system pressures are required. And of course, it is always an objective to increase the coefficient of performance of such systems.

In both of the above-described types of prior art systems, the refrigerant is liquefied, or condensed. It is thus subjected to a change in physical state, or phase. There are some relatively inefficient systems of the prior art wherein the refrigerant, such as air, does not liquefy. Such a refrigerant is simply subjected to different pressures and temperatures. In all aforementioned prior art instances, the gas molecules only undergo changes in translational energy, and there is no change in molecular state.

All refrigeration systems require some sort of net energy input to the system, to accomplish the desired work of moving energy (heat) from one point to another. In the prior art, the work energy (power to the compressor, or heat to the generator, as the case may be for the two representative types of prior art systems mentioned above) is imparted to the refrigerant in a way which raises the enthalpy of the working fluid at the point where work energy is imparted.

And, as is well known in physics and engineering, when energy is imparted to fluid molecules as heat, or when there is inevitable heating of a gas during compression in accord with Boyle's Law, the increase in temperature of the refrigerant gas is manifested as an increase in molecular translational energy. According to classical modeling, for the temperature ranges of interest relating to this patent application, such an increase in molecular energy of a fluid is manifested principally as an increase in the amplitude and frequency of translational motion of the molecules. As will be seen from the Description which follows, the present invention employs principles which differ from these traditional operational modes.

The present invention has relation to U.S. patent application Ser. No. 09/346,721, now U.S. Pat. No. 6,282,894, entitled "Engines Driven by Laser Kinetic Cooling", filed on Jul. 2, 1999 by D. Smith, an applicant here. The related application describes a closed loop engine or prime mover, such as a turbine or positive displacement engine, which is powered by radiant energy, in particular by laser energy, delivered to the working fluid.

SUMMARY

An object of the invention is to provide a heat transfer system and method, for cooling or heating things, which employs minimal moving parts and an environmentally friendly and relatively inexpensive working substance. A further object is to have the refrigeration and heating systems operate in closed and open loop modes, and with higher efficiencies than prior art systems provide. A further object of the invention is to employ electromagnetic radiation energy in refrigeration and heat pumping. A still further object is to optimize the operations of such new processes by utilizing kinetic cooling; to provide working substance gas mixtures which are particularly adapted for kinetic cooling; and to provide electromagnetic radiation energy sources and systems for achieving kinetic cooling which are more cost effective than lasers.

In accord with the invention, kinetic cooling of a working substance is used for refrigeration or heating of matter. Electromagnetic radiation, of one or more selected wavelengths, is impinged on a working substance, e.g., a gas mixture, contained within apparatus, to thereby cause the substance to be kinetically cooled. Kinetic cooling occurs when radiant electromagnetic energy causes molecules of a gas or other working substance to become excited. A significant number of molecules increase in energy from a first energy level to higher vibrational energy levels. Molecular collision processes induce corresponding restoration of thermodynamic equilibrium in the gas. The effect of the irradiation is to decrease the working substance temperature. When the invention is used for cooling, thermal energy or heat from the matter to be cooled is transferred to the kinetically cooled and excited working substance prior to its relaxation from its excited state, as it flows along a flow path and through a first heat exchanger. The heat is subsequently discharged from the working substance in a second heat exchanger, or by dumping of the working substance to a heat sink, according to whether a closed loop or open loop system is being operated.

In a closed loop embodiment referred to as a Type I system, recirculating gas is the working substance which flows along a closed loop gas flow path The means for kinetically cooling the gas is a mirrored cooling cell which channels the flowing gas as electromagnetic radiation impinges on it. The kinetically cooled gas is then quickly flowed to a first heat exchanger where heat from the environment or matter being cooled is transferred to the gas, thus raising the gas temperature. The gas is then flowed further downstream to a region where, with continued passage of time of flowing, natural relaxation (loss of vibrational energy) of the gas molecules occurs, according to a particular time function characteristic of the gas composition and system pressure. The relaxation also causes the gas to rise in temperature. The heat in the gas is then discharged from the working substance, either to a heat sink, or to a region where heating is desired, according to whether the system is being used for refrigeration (e.g., as is a common building space air conditioner) or for heating (e.g., as is a common building space heat pump). In one variation of a Type I refrigeration system, the working gas flows through a compressor, then a first heat exchanger for sensible cooling of the gas, then through a cooling cell for kinetic cooling, then through an expander, and then through a second heat exchanger where heat is absorbed by the gas from the thing being refrigerated.

In further accord with the invention, a closed loop system, called a Type II system, comprises a simple fan as the means for flowing gas. The fan greatly reduces energy consumption and increases Coefficient of Performance, compared to prior art reversed Brayton cycle systems.

In further accord with the invention, an open-end system, called a Type III system, comprises a means for kinetic cooling and a downstream heat exchanger for transferring heat from the matter being cooled to the working gas. The working gas with its acquired thermal energy is then discharged to a sink, i.e., the environment. As an example, atmospheric air is ingested into the cooling cell, then flowed through a heat exchanger, and then discharged back to atmosphere. An additive gas may be injected into the air flowing into the cooling cell, to make the working substance more amenable to kinetic cooling. In one application, the invention is used for cooling the interior of an automobile and the additive gas comprises carbon dioxide or other gas derived from the exhaust of the engine, such as an internal combustion engine or a fuel cell.

In further accord with the invention, the working substance in the cooling cell is impinged upon by electromagnetic radiation (e.g., light) from a source which provides one, or more than one, suitable gas-exciting wavelength. For example, a working fluid comprised of nitrogen and carbon dioxide is irradiated by pulsed or continuous laser light at 10.6 micron wavelength. The light source may be inside or outside the cooling cell. A light source of comparatively broad bandwidth of radiation may be used, such as light provided by a high intensity electric arc discharge, a black body source such as a resistance heating element, or the Sun. In another embodiment, radiation from such multi-spectral sources is filtered before passing through a cooling cell window into the cooling cell interior. For instance, for a selected working gas, only predominately 9–11 micron wavelengths are impinged on the working gas, to thus avoid sensible heating of the gas which is unbeneficial. The cooling cell typically has mirrors or other reflective means to increase the path length of a the electromagnetic energy beam, through the gas flowing within the cell, to thereby increase the extent of beam or energy absorption by the gas.

In the invention, the working substance is a fluid comprised of at least one substance, for example carbon dioxide, which is kinetically coolable, i.e., the working substance. The fluid responds significantly to radiation, by changing from a first energy level to a higher energy level, so that the molecules of the fluid are characterized by significant vibrational energy. In a preferred practice, a diatomic molecule gas, such as nitrogen, which has a certain relaxation time, is used in combination with a triatomic molecule gas, such as carbon dioxide, which has a comparatively shorter relaxation time.

In another aspect of the invention, a working gas comprises a mixture of radiation-responsive gas components, where the components respond differently to particular wavelengths of energy. Thus, the gas mixture absorbs energy at a greater multiplicity of wavelengths than does a single component gas. Such gas mixtures make it more feasible and efficient to use wider wavelength-band light sources. In one kind of such gas mixture, gases having different chemical properties are used. For instance, $CO_2$ and $NO_2$ are used in combination with $N_2$; or $N_2O$ and $CO_2$ may be used with $N_2$. In another kind of gas mixture, the components comprise two or more isotopic species of the same elementary chemical (molecular) composition gas. For instance, $C^{12}$ and $C^3$ isotopes may be respectively present in the two different species of carbon dioxide gas. In another example, the working substance mixture comprises a multiplicity of isotope-species of different chemical composition component gases.

The systems of the invention allow the use of common natural environment gases, such as $CO_2$ and $N_2$. Such gases are already present in the atmosphere and are therefore largely benign environmentally, compared to the gases familiarly used in common prior art commercial refrigeration and heat pump systems, such as those using the reversed Brayton cycle systems. Refrigeration and heat pumping with the invention is characterized by high coefficients of performance. Because they employ radiant energy, the systems or the invention are useful for operation from sources which are located at some distance from the apparatus.

The foregoing and other objects, features and advantages of the present invention will become more apparent from the following description of preferred embodiments and accompanying drawings.

DESCRIPTION

Figure 1:
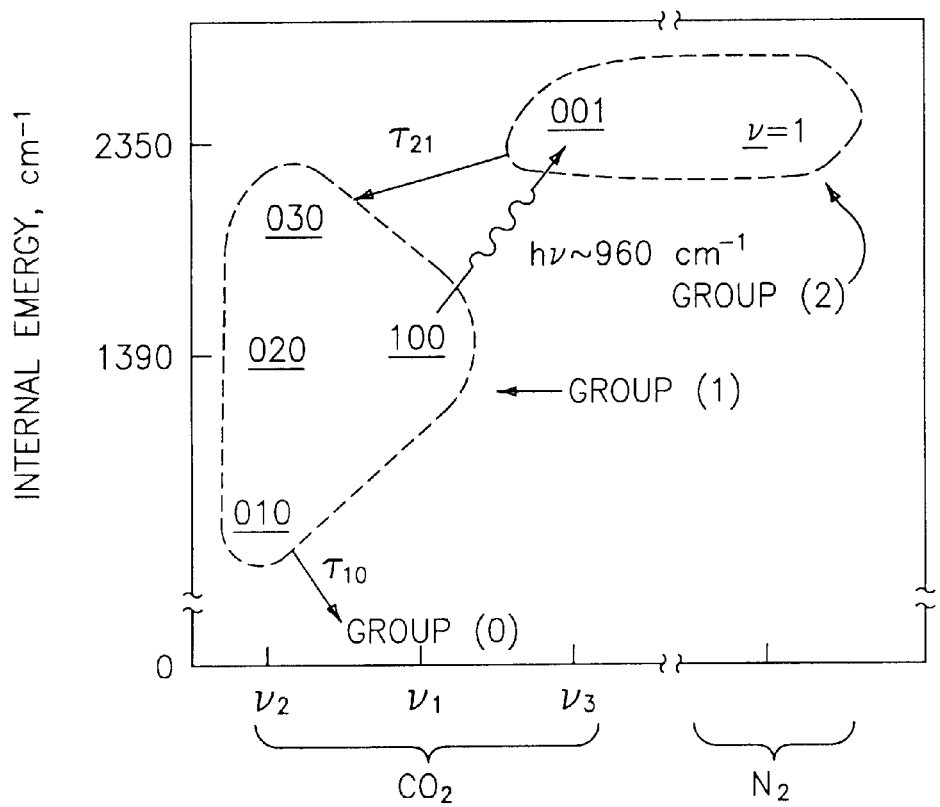
FIG. 1 is a graph showing conceptual relationships of internal energy levels of carbon dioxide and nitrogen gas molecules with respect to excitation and internal energy level.

The aforementioned U.S. Pat. No. 6,282,894 describes engines powered by radiant laser energy, using kinetic cooling phenomenon. The Figures and Description of the Best Mode thereof are hereby incorporated by reference.

In the following description, the terms working substance or working fluid or refrigerant are used interchangeably. They refer to a substance, such as a gas, which is utilized within the apparatus for refrigeration or heating, and in the method, of the invention. The term "gas" will also comprehend a mixture of gases and the inclusion of a vapor. The invention is described mostly in terms of refrigerating a flowing external air stream, as is typical for a room air conditioner. However, it will be understood that the invention may alternatively be used for cooling or heating other gas environments, a liquid, or a solid object. Thus, generally, the use of a particular term in connection with an embodiment is not intended to be limiting; and, the use of general terms like thing, object, environment or matter, are intended to embrace any sort of solid, gas or liquid matter. In the description, and in the examples in particular, unintended thermal losses to and from the surrounding environment and flow losses in the gas are ignored for simplicity of illustration. Likewise, PV diagrams herein are idealized and simplified. The terms "heat" and "thermal energy" are used interchangeably. The term "light" is meant to generally comprehend electromagnetic radiation as the term is familiarly used by physicists; in particular it refers to the portion of the spectrum which includes the visible, infrared, and ultraviolet wavelengths. For conciseness, the wavelength of light is characterized herein simply in terms of the length of a wave, e.g., "10.6 micron (micrometers)", without the repetitious use of the word "wavelength". The term "heat" refers to thermal energy.

Kinetic cooling, as used herein, ought to be understood in the following context. Generally, when gas molecules are excited to a high state, they may emit light upon reverting to their lower first state. In a laser, radiation of a selected wavelength is caused to impinge repetitiously on excited molecules of selected gases, to thereby cause the molecules to emit light which is coherent in wavelength with the radiation being impinged. The term kinetic cooling refers to a process which is essentially the reversal of the process which occurs in a gas laser which produces coherent light. See F. G. Gebhardt and D.C. Smith, "Kinetic Cooling of a Gas by Absorption of CO2 Laser Radiation", Applied Physics Letters, Vol. 20, No. 3, 1 Feb. 1972, p. 129–132. The disclosure of the foregoing article is hereby incorporated by reference.

One mode of invention is first described in terms of using a laser light source and a working substance, or refrigerant, which is a combination of nitrogen and carbon dioxide. As will be evident, the invention does not require the use of a coherent light source (laser), nor use of the specific exemplary gases.

Excited gases are conceived as having internal energy. The following comprises some simplified aspects of such, with the focus on kinetic energy. Kinetic internal energy in diatomic gases, e.g., $O_2$ and $N_2$, principally comprises vibrational energy, as the atoms of a molecule move toward and away from each other, and molecular rotation. Kinetic internal energy in energized triatomic gases, e.g., $CO_2$, $N_2O$, $NO_2$, and other polyatomic gases, comprises the same constituents as the diatomic substances—often in more complex modes, along with bending, symmetric and asymmetric stretching (and possibly pseudo-rotation, inversion, etc., depending on the particular molecule). It will be appreciated that the nature of energy levels in gases or other substances is statistical. Thus, for any energy level there will be variations in energy levels from individual molecule to molecule within a distribution of the totality of molecule energy levels about a particular mean. Thus, when reference is made to a particular state or energy level herein, it will be understood that the characterization is a comparative condition wherein a significant, perhaps predominant, number of molecules of the substance enjoy the particular state or condition; and, it will not be understood to imply that all molecules of the substance will be at such state or condition.

To produce the desired kinetic cooling in the present invention, the molecular absorption of light by at least a portion of the working substance must result in a transition therein by molecules, from a first energy state to a higher energy state characterized by significant vibrational energy. When there is some such molecular absorption of light, a naturally occurring restoration of thermodynamic equilibrium by collision processes raises other molecules from translational energy states (which represent sensible heat), to replenish molecules at the lower vibrational state. Thus, in a gas, molecules may transition from the first vibrational level state to a second vibrational level, and concurrently from a translational level to a first vibrational level. In practice of the invention, it will be appreciated that the energy of light or other electromagnetic source thus stored in the gas by state change must be substantially retained for a time sufficient to enable the gas to flow from the location where it is first excited and kinetically cooled to the location where it absorbs energy from the thing being cooled, before the gas relaxes substantially.

FIG. 1 shows a three group approximation to illustrate molecular gas absorption and relaxation processes, familiar in laser technology. The predominant vibrational energy is illustrated as an example in the Figure. It will be understood that other forms of energy are present. With reference to the Figure, the energy levels of a preferred and exemplary $N_2$–$CO_2$ working substance mixture are divided into three groups (0), (1) and (2) when the mixture, predominately the $CO_2$ component, absorbs 10.6 micron light. Level (0) is the ground state at which there is no significant vibrational energy. When excited to levels in group (1), $CO_2$ molecules will be characterized by symmetric stretch $v_1$ and bending $v_2$ modes, while $N_2$ will be characterized by symmetric stretch $v_1$ mode. When excited sufficiently, such as by photon having energy hv (where h is Plank's constant and v is frequency), $CO_2$ is raised to levels of group (2), or higher levels not shown on the Figure. At level of group (2) the $CO_2$ rapidly establishes thermal equilibrium with $N_2$ as $N_2$ takes on vibrational energy from $CO_2$. When there is $C_{O2}$ at levels of group (2), there will be a population of 001 excited molecules, characterized by $v_3$ stretch mode. There will be a corresponding momentary depletion of the lower level 100 molecules which characterized levels of group (1). That depletion of molecules at levels of group (1) will be repopulated by molecules from the group (0) level, moving to level of group (1) as a result of collision processes. As indicated, this is a simplified presentation and other more complex forms of energy will be present in excited gases. In the description and claimed invention here, it should thus be understood that a general reference to vibrational energy of gas will also comprehend other more complex modes of energy associated with irradiation-excitation of a gas.

In the absence of continued excitation, molecules which are thus excited to levels of groups (1) or (2) will predominantly de-excite, or relax. In doing so, they will interchange energy with their environment. For example, molecules fall from levels of group (2) to levels of group (1), and from levels of group (1) to level of group (0), in relaxation times $\tau_{21}$ and $\tau_{10}$, respectively. If $\tau_{10}$ is less than $\tau_{21}$, then vibrational equilibrium is reestablished at the expense of translational energy and the gas is cooled. If $\tau_{10}$ is greater than $\tau_{21}$, the gas is heated. Vibrational energy imparted to $CO_2$ molecules is transferred to, and shared with, $N_2$ molecules of the gas mixture. For understanding of parts of the preferred embodiment, it should be noted that, once a diatomic gas such as $N_2$ is excited to the $v_1$ level, it will tend not to quickly relax unless there is present another polyatomic gas, for reasons relating to conservation of momentum.

Figure 2:
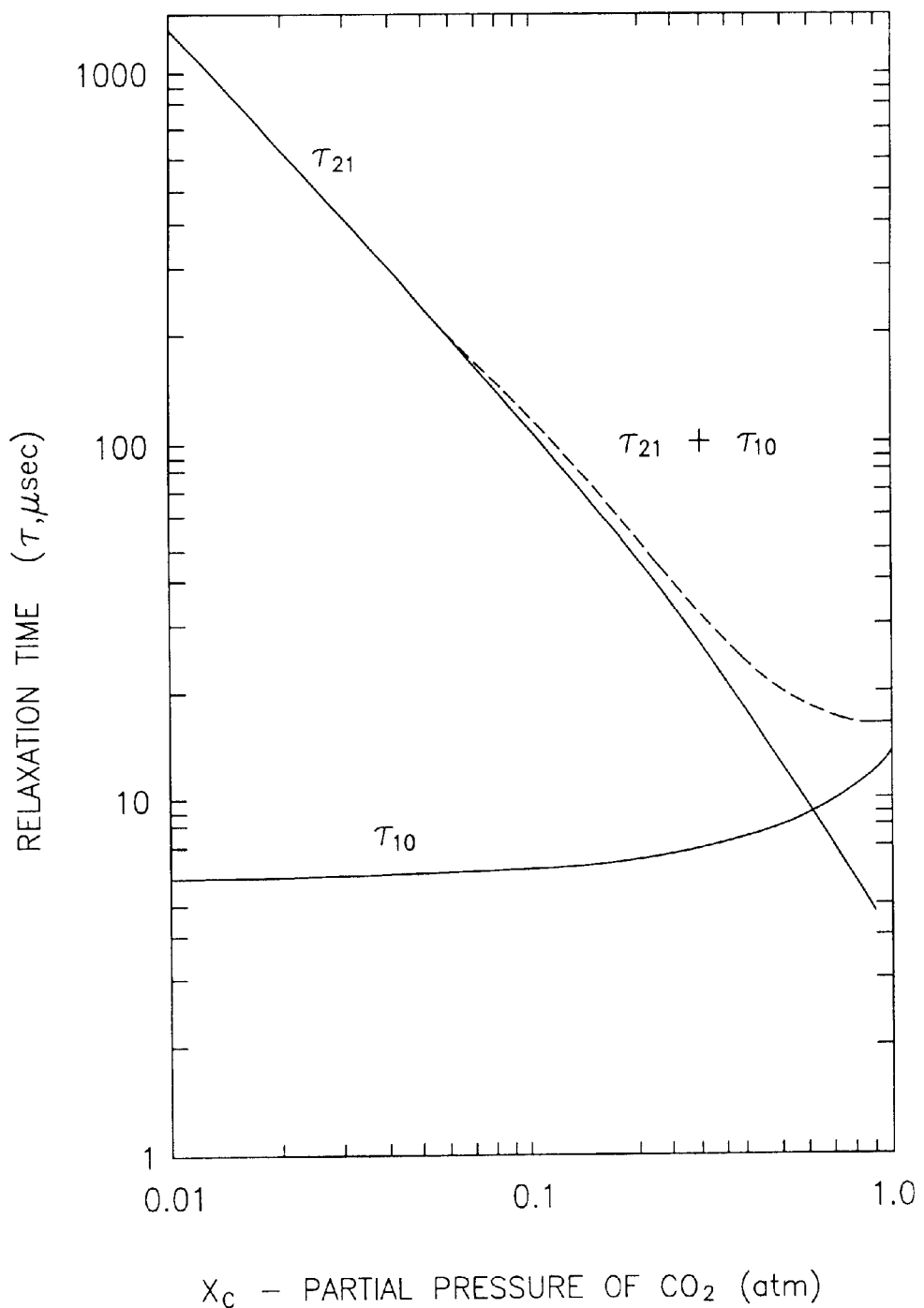
FIG. 2 is a graph showing the relationship between carbon dioxide relaxation time and partial pressure of carbon dioxide, for a carbon dioxide-nitrogen gas mixture.

FIG. 2 shows the effect of partial pressure $X_c$ of $CO_2$ in a $N_2$–$CO_2$ mixture, at one atmosphere and 300° K (Standard Temperature and Pressure, or STP), on relaxation times. The relaxation times shown will be lengthened by lowering temperature and total pressure. FIG. 2 indicates that relatively small partial pressures of $CO_2$ are desired to obtain the cooling which results from the desired $\tau_{10}<\tau_{21}$ realm.

The ability of a gas or mixture to absorb radiant energy and become excited, and to thus be amenable for use in the invention, is a function of the coefficient of absorption of energy per unit length of working gas, $\alpha$. As an example, at Standard Temperature and Pressure (STP), $\alpha$ of a gas containing $CO_2$ and another comparatively non-excitable gas, such as $N_2$ is $$\alpha = 2 \cdot 10^{-3} \rho_c P \text{ cm}^{-1} \quad (1)$$

where $\rho_c$ is the partial pressure of $CO_2$ expressed as a fraction of the mixture, and P is the total pressure in atmospheres.

Figure 3:
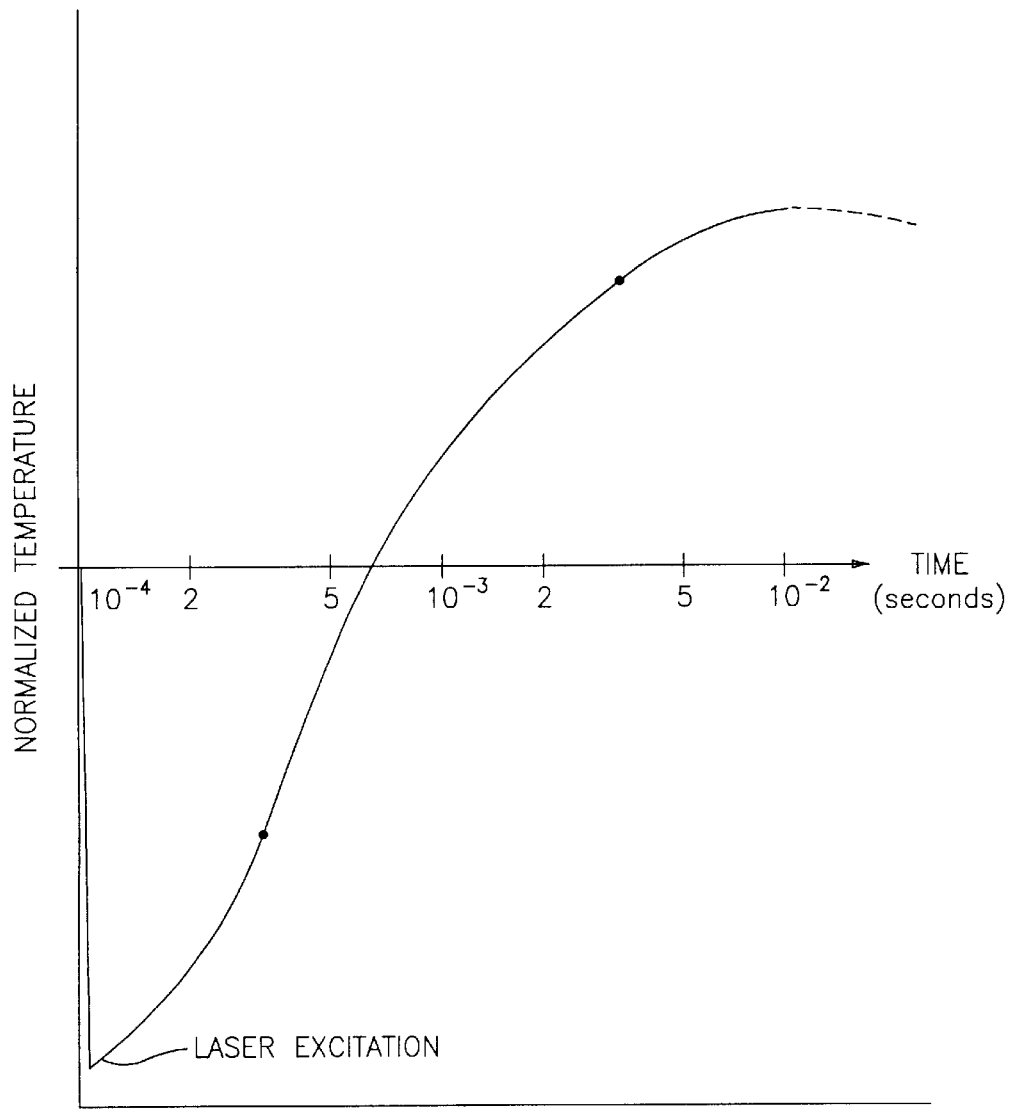
FIG. 3 shows the time-temperature profile of carbon dioxide in a 1% carbon dioxide-nitrogen mixture, during and after irradiation in the cooling chamber of apparatus like that shown in FIG. 6.

FIG. 3 shows the nominal time-temperature relationship of a static quantity of gas comprised of predominantly $N_2$ with some fraction of $CO_2$, during and after irradiation, when the gas is not being employed in any working cycle. As indicated, the laser excitation rapidly cools the gas in a short time. Then the gas starts rising in temperature as the gas relaxes over time. The temperature increases to a value higher than the beginning temperature, owing to the net input of light energy, To the extent the gas loses heat energy to its surroundings, it will cool back to the starting temperature as suggested by the dotted portion of the curve at the right.

Figure 4:
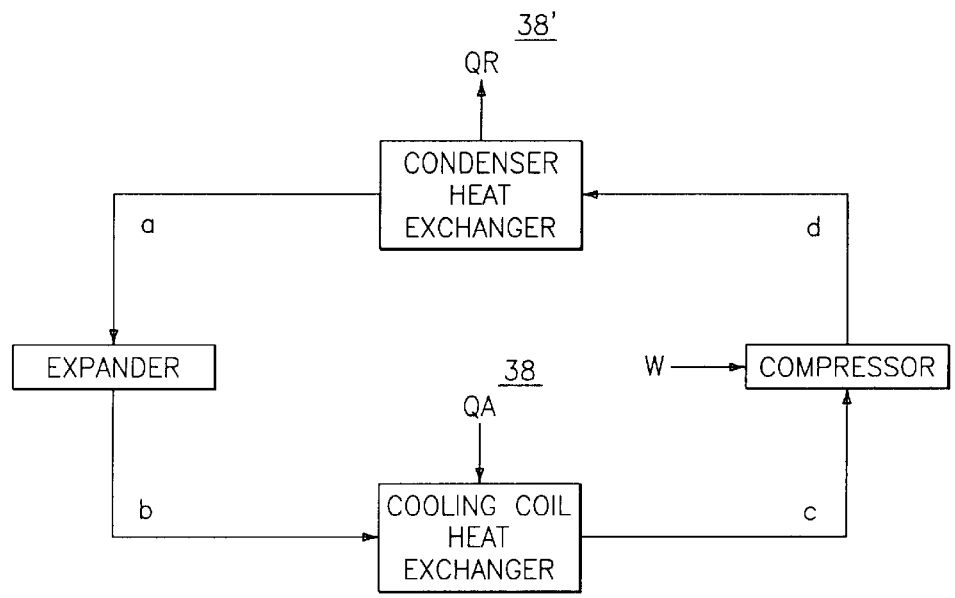
FIG. 4 is a flow diagram of a prior art reversed Brayton cycle refrigeration system.

For reference, a typical prior art reversed Brayton cycle system, used in refrigeration and heat pumping, is first described. FIG. 4 shows the system in block diagram form.

Figure 5A:
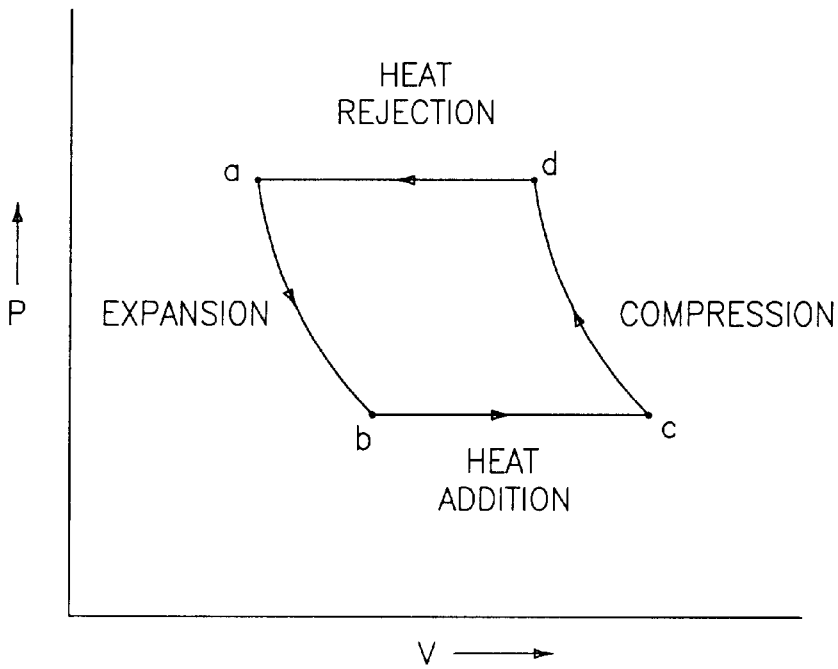
FIG. 5A is a Pressure-Volume diagram for the working fluid of the FIG. 4 system.

The gas moves along a flow path, within apparatus. It is isentropically compressed at c-d; cooled as heat QR is dumped to waste heat-receiving environment 38' at d-a while gas passes through a waste heat exchanger, commonly referred to as the condenser; expanded isentropically at a-b, to thereby cause Joule-Thomson effect cooling; and, heated by addition of heat QA at b-c, as the gas flows at constant pressure through a heat exchanger, commonly referred to as the cooling coil or evaporator in prior art systems. FIG. 5A shows a Pressure-Volume (PV) diagram of the working substance as it flows through the conventional reversed Brayton cycle apparatus of FIG. 4 using a non-liquifying gas.

Of course, the heat QA is that which is extracted from the environment or matter 38 which is being refrigerated. Matter, which is often referred to herein, may be a heat exchanger; it may be that with which the heat exchanger is in heat transfer communication; and, it may be a fluid such as air, or an object. In common commercial systems, a motor normally drives the compressor and expansion is through a nozzle. While refrigeration may be achieved in a reversed Brayton cycle using a working substance such as air or nitrogen, in commercial refrigeration systems, gases such as Freon™ fluorohydrocarbon gas are commonly used. Such gases liquefy during the compression and heat rejection parts of the cycle and provide improved performance, thereby utilizing the large latent heat of vaporization. As is familiar, reversed Brayton cycle can be used for heating, in a so-called "heat pump" mode. In such a mode, heat is transferred from the environment 38, which may be the external atmosphere, to environment 38', which may be the interior space of a building.

Figure 6:
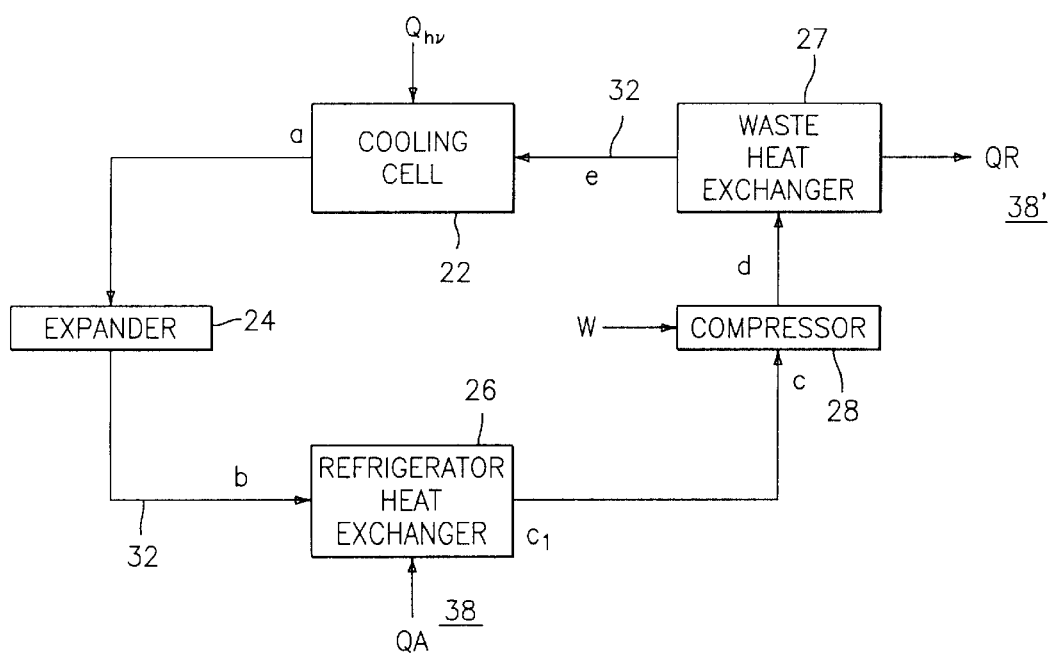
FIG. 6 is a flow diagram for an essential embodiment of the invention.
Figure 5B:
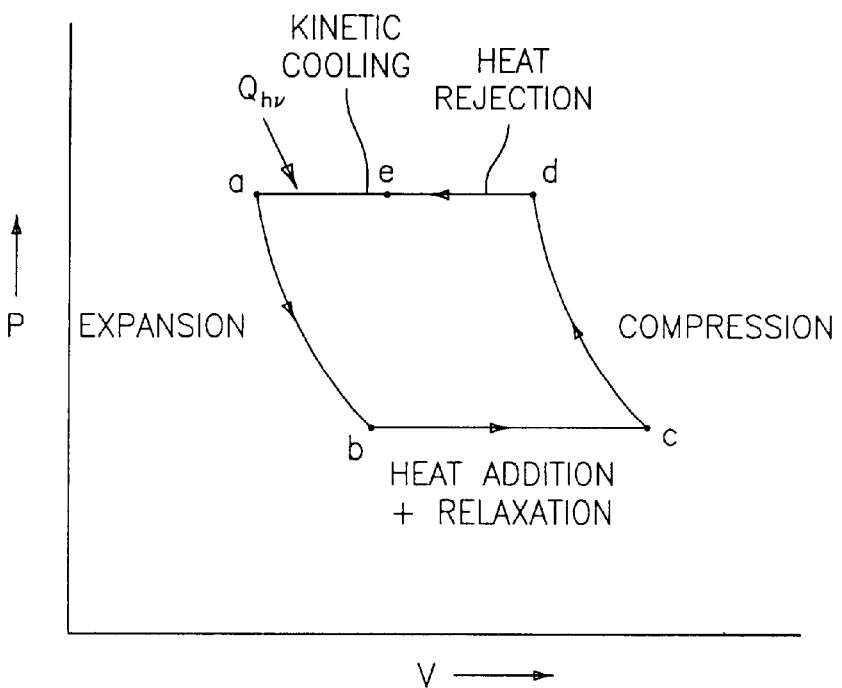
FIG. 5B is a Pressure-Volume diagram for the working fluid of the FIG. 6 system.

One embodiment of the invention employs a $N_2$–$CO_2$ gas mixture in a system schematically illustrated by FIG. 6. Similarities with and differences from the reversed Brayton cycle will be appreciated. The FIG. 6 system is comprised of a cooling cell 22, an expander 24, a refrigerator heat exchanger 26, a compressor 28, a waste heat exchanger 27, all connected by pipe lines 32. The working substance, for example, $N_2$–$CO_2$ gas, flows along the path indicated by the arrows of lines 32. A flow path as the term is used in connection with this description comprises one or more interconnected devices having interior spaces for channeling gas movement. The letters (a) through (e) indicate points along the flow path and the thermodynamic cycle. Gas is isentropically compressed at c-d, whereupon compressor work energy W is imparted to the gas; it is then sensibly cooled at d-e, to discharge waste heat QR to environment 38'; it is then irradiated by a laser or other means in the cooling cell, to add energy $Q_{hv}$ at e-a, whereby the gas becomes kinetically cooled; it is then expanded isentropically in the expander at a-b, for further cooling; and, it is then flowed through the refrigerator heat exchanger at b-c to absorb heat QA from the region 38 which is being refrigerated. The velocity of gas flow is high enough to enable the gas to flow from the cooling cell 22 and through the expander 24 and refrigerator heat exchanger 26 before it substantially fully relaxes from its kinetically excited level to ground state (i.e., group level (1) in FIG. 1). The apparatus is essentially constructed of ordinary metals, and other materials familiar to the artisan. FIG. 6 embodies a closed loop system which is called a Type I system herein. FIG. 5B shows a PV diagram for a non-liquifying working gas as it flows through the FIG. 6 apparatus. The invention results in P-V and S-T thermodynamic cycles which are new, compared to reversed Brayton cycles and any other thermodynamic cycles previously used for heating or cooling.

With respect to the thing being cooled, the heat exchanger 26 is substitutionally functional for the cooling coil of a conventional reversed Brayton cycle refrigeration system. Assuming room air or the like is being cooled by the system, air of the environment 38 is preferably forced to flow through the heat exchangers 26 by unshown means, like a fan, semi-positive positive displacement blower, or other gas mover, to increase the rate of heat transfer and shorten the length of the heat exchanger. In the invention, it is important that the working gas flow quickly through the heat exchanger, in the context of the relaxation time $\tau_{21}$ of the working gas, so the gas does not substantially relax before passing through the heat exchanger 26. After heat is transferred to the gas from the surrounding environment 38 in the heat exchanger 26, the gas relaxes and its temperature therefore increases as it continues its flow downstream along the flow path. See also, discussion relating to FIG. 3 and FIG. 9. Of course, the Type I invention, as well as the Type II invention which will be described, can be used as a heating device, or heat pump, along the same lines as described above in connection with the prior art reversed Brayton cycle devices. Thus, while for simplicity the invention is primarily described in terms of refrigeration, the artisan and reader will understand and infer throughout the alternative use of the apparatus and method for heating.

Figure 7:
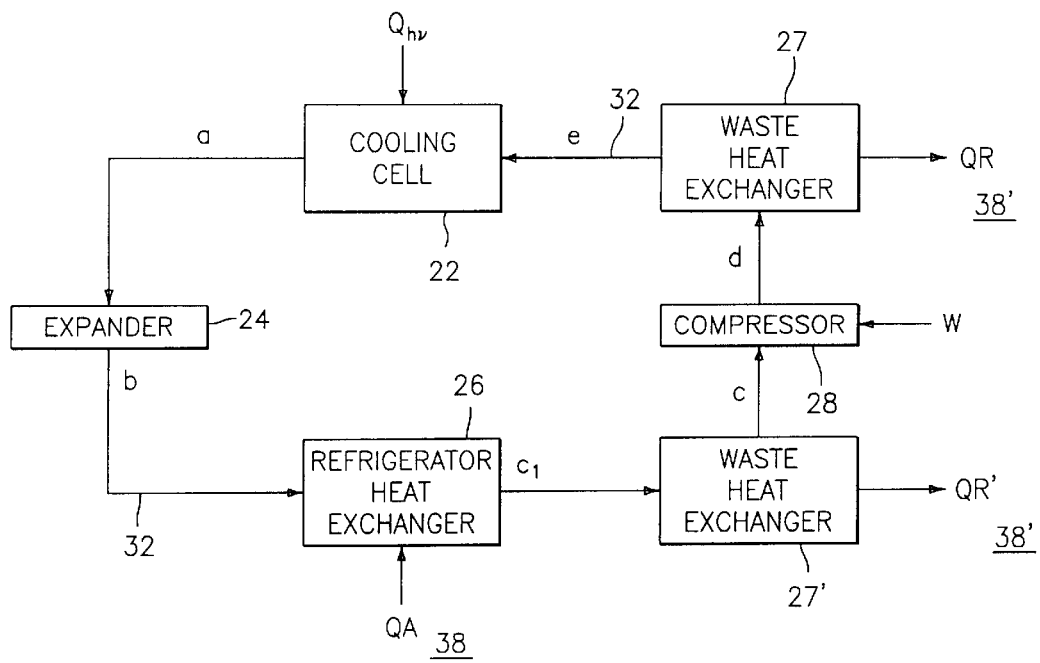
FIG. 7 is a flow diagram for a system like that of FIG. 6, with two heat exchangers.

FIG. 7 shows another Type I system, a modification of the system of FIG. 6. There is a second waste heat exchanger 27', for discharging heat QR'to environmental heat sink 38', located upstream of the compressor 28. As is known, pre-cooling gas is desirable practice for improving compressor performance, in general. Notwithstanding, in still another embodiment, not shown, a Type I system may have heat exchanger 27' without heat exchanger 27. In still another embodiment, the expander 24 is located upstream of the cooling cell 22, in close flow path communication therewith.

For FIG. 7, in cycle part e-a, gas flowing along path 32 is irradiated and excited by laser energy $Q_{hv}$, being thereby kinetically cooled in cooling cell 22. The gas is then expanded and cooled isentropically during part a-b; and, it is then heated by addition of energy QA in heat exchanger 26, during sub-part b-$c_1$. The gas is then heated as it flows toward compressor 28, during the cycle part b-c, principally during sub-part $c_1$-c, due to the effects of molecular relaxation. The gas flow velocity is by design that which is necessary to flow the gas from the cooling cell, expander, and heat exchanger 26 in a time which is prior to the occurrence of substantial relaxation. By means of heat exchanger 27', a lot of that heat which is added at heat exchanger 26 and by relaxation is rejected from the gas as heat QR' in cycle part $c_1$-c, passing to waste heat to environment 38'. Energy, manifested in part as heat, is added during compression in cycle part c-d. A significant part of such heat is discharged as heat QR to environment 38' as the gas passes through heat exchanger 27, flowing toward the cooling cell, during cycle part d-e.

Thus, in continuous operation of a Type I system as described for FIG. 7, the energy QR and/or QR' discharged from the working substance is equal to the energy, $Q_{hv}$ plus QA, which is added to the working substance. Thus, the average temperature equilibrium of the gas is maintained within the system during operation. In the absence of any waste heat exchanger, the average gas temperature will rise, because as mentioned, the idealized apparatus and cycles described herein assume no unintended energy losses. Of course, in some real systems where there are sufficient thermal losses in the connecting pipelines, such pipelines may function as a heat exchanger for waste heat or for usefully transferred heat; and, such kind of pipelines will be means for transferring heat within the scope of the invention.

While there are some similarities, the process of the invention, as exemplified by the Type I systems, is substantially different from the conventional reversed Brayton cycle. Referring to FIG. 4–7, and particularly FIGS. 5A and 5B, in the invention the part d-a of the cycle comprises "heat rejection" and "kinetic cooling". In comparison, the corresponding portion of the reversed Brayton cycle is entirely "heat rejection". In the part b-c of the invention system/cycle, the working gas is heated by the effects of molecular relaxation as well as by heat addition from the thing (38) being cooled. In comparison, the corresponding reversed Brayton cycle fragment comprises only heat addition from the thing being cooled during cycle part b-c.

Figure 8:
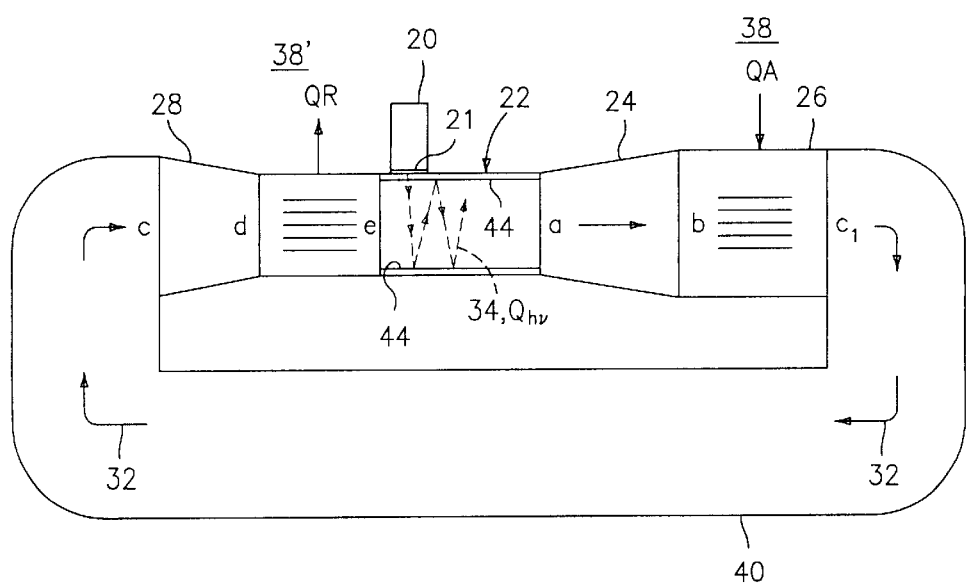
FIG. 8 semi-schematically shows the components of an apparatus related to FIG. 6 with a laser energy source.
Figure 9A:
FIG. 9 schematically shows how various parameters vary along a flow path, or with time, corresponding with the diagram and apparatus of FIG. 6 and 8.
Figure 9B:
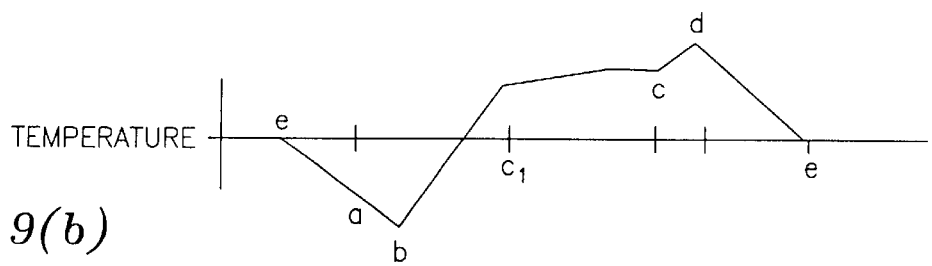
Figure 9C:
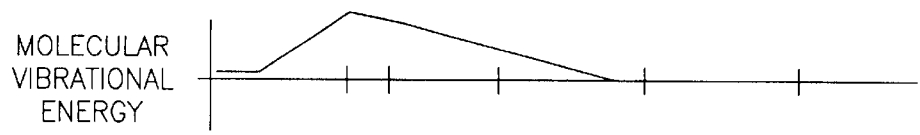
Figure 9D:
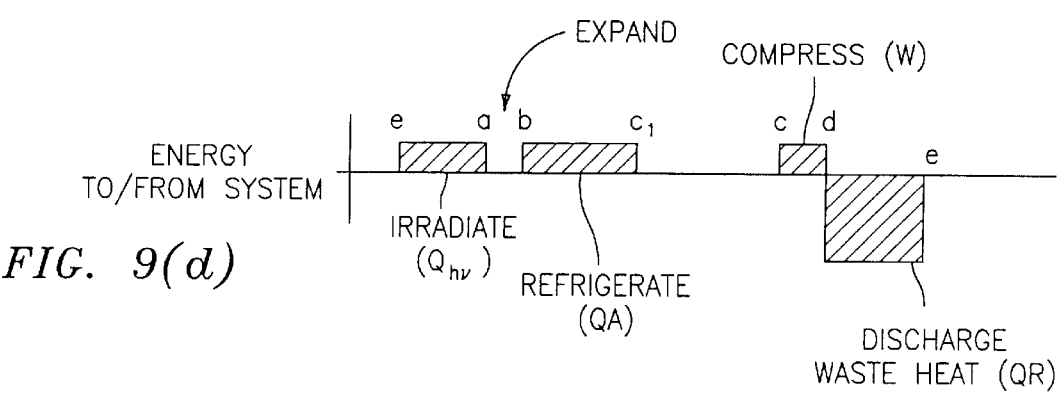

The cooling cell is a device which enables radiation energy to be imparted to the working substance while the working substance is channeled along a flow path by the walls of the cell. Kinetic cooling is effected when there is a suitable working substance flowing through the cell and when a suitable energy source is coupled to the cell or made integral with it. The cooling cell of the FIG. 6 and 7 systems, and variations, are described in more detail below. The expanders in the invention apparatus may be nozzles or turbines. The compressor 28 may be a piston, scroll compressor or other positive or semi-positive displacement device. The heat exchangers are preferably common tube or plate type devices, but may comprise other known devices useful for exchanging heat from a gas stream to a solid or fluid, such as heat pipes and devices comprising rotating disks. Heat exchanger as used herein is intended to comprehend generally any mechanism or procedure for transferring heat between two things, where a temperature difference exists between the two things. Referring to a common tube type or plate type heat exchanger as an example, and without limiting the generality of the invention, the working substance will transfer heat to a first portion thereof, namely the tube or passageway through which the working substance flows. The heat then may be transferred by conduction, convection and (less commonly) radiation to a second portion of the heat exchanger, namely the tube or passageway through which flows the fluid which is either being cooled or heated, as the case may be. The first and second portions may be opposing walls of the same conduit. FIG. 8 semi-schematically shows a preferred Type I apparatus, related to the system shown in FIG. 6, A 10.6 micron laser 20 is attached to the cooling cell 22. It delivers radiation $Q_{hv}$ to the cell interior in the form of beam 34. The beam is transmitted through a suitable transparent glass window 21 in the cell wall, to the interior of the cell. The walls of cell 20 are configured with opposing mirrors 44 which reflect the radiation beam 34, causing the beam to be reflected about within the cell, and to travel along the zig-zag path suggested by the dashed line. By reflecting the beam about within cell, the beam path length through the gas is increased; and, thus the amount of energy which is absorbed by the gas molecules is increased. Cells which lack mirrors are within contemplation of the invention, albeit they would be inefficient using present technology. The laser may be a common commercial $CO_2$ pulsed laser, operated at a pulse repetition rate of about 10,000 pulse/s and a pulse length of about 10 microseconds. A continuous wave laser providing a steady radiation output may be alternatively used. But, for any given power level device, the continuous wave laser it is less preferable to the pulsed laser, since the peak power of the former is lower than that in a pulse of the pulsed laser. The continuous wave laser is therefore somewhat less effective in activating any given molecule. In alternate cooling cell embodiments, the laser 20 can be mounted near the downstream end of the cooling cell 22, so the beam progresses upstream, and multiple lasers may be used.

FIG. 9 shows what happens to a small differential quantity of gas during the Type I closed loop cycles representative of FIG. 6 or 8 systems. It shows certain parameters as a function of a common time cycle, also corresponding with points along the flow path. Part (a) shows the laser radiation, or energy, input. Part (b) shows the temperature with points of the cycle which correspond with the diagrams and FIG. 6 and 8. Part (c) shows how the gas is excited and then relaxes. Part (d) shows the energy inputs and outputs to the working gas. The irradiation energy in Part (d) is the same as that shown in Part (a). (During irradiation, there is a change in temperature of the gas, but no change in sensible heat, as occurs during other parts of the cycle when temperature changes.) Also note that during the cycle part $c_1$-c, Part (d) shows there is no energy transfer into the system, although there is a rise in temperature shown in Part (b). This is because relaxation phenomena cause the heating.

The general energy equation relationship for the operation of the cooling cell of FIG. 8 is:

$$C_p(\rho v A)\frac{\Delta T}{D} = \alpha I V(-2.4e^{-t/(\tau_{21}+\tau_{10})} + 1) \quad (2)$$

where, $\rho$ is gas density, $C_p$ is gas specific heat, v is average gas velocity within the cell, A is cross sectional area of the cooling cell, D is the length of the cell in the flow path direction, V is the volume of the cell, $\alpha$ is the coefficient of absorption per unit length of the working gas, $\Delta T$ is the temperature change in the cooling cell, I is the laser intensity, and t is the residence time of the gas in the cell, which time is equal to D/v at the cell exit. In Equation (2) the term to the right of the equal sign is the total power absorbed in the cooling cell, while the bracketed term on the left side is the mass flow per unit time.

In the practice of the invention, there is available, for cooling, energy equivalent to 1.4 hv for each 1 hv of light energy absorbed by the working gas. This reflects the relationship of energies of molecules at the level of group (1) compared to (a) those which are at level of group (0) (ground state) and (b) those which are at the level of group (2). See FIG. 1. So, in practice the invention provides a bonus of cooling effect (heat removal from matter) which is 40 percent greater than the absorbed laser energy.

Calculations using the foregoing and other formulae have been made, to show cycle parameters and suggest equipment dimensions. It should be understood that the data given herein are illustrative or suggestive. As such time as the extensive engineering work necessary for designing actual practical devices is done, it is likely the data will change. One calculation has been done for an exemplary Type I closed loop system, like that of FIG. 6, when producing about 3,300 j/s cooling capacity, where j represents joules. The working gas is 1% $CO_2$, balance $N_2$. (All gas mixtures herein are stated in terms of volume fraction). The calculated temperatures and pressures that will be encountered during operation are shown in Table 1.

TABLE 1

Calculated Nominal Temperatures and Pressures at Various Points in the Apparatus of FIG. 6 During Use

| Point | Temperature-° K. | Pressure-kPa |
|---|---|---|
| a | 530 | 1380 |
| b | 332 | 275 |
| c | 490 | 275 |
| d | 782 | 1380 |

The cooling cell dimensions and characteristics of the laser or other energy source are chosen appropriately for efficiency of absorption in the cooling cell. As an illustration, for the working gas mixture of the example just described, where $\tau_{21}$ is about 0.015 seconds, an adequate kinetic cooling cell is calculated to have a cross sectional area of about 150 square cm (equivalent to about 14 cm diameter), and a length of about 15 cm. The expander and heat exchanger (which transfers heat into the system to produce the desired cooling effect on the matter external to the system) will each have lengths of about 20 cm. The gas has a velocity of about 15 m/s at the cooling cell entrance and about 47 m/s at the heat exchanger entrance. It is estimated that an efficient cross flow plate type heat exchanger will be about 900 square cm in cross section (equivalent to a 30 cm square). Thus, it will be appreciated that a one-ton cooling system using the invention can be fairly compact.

Figure 10:
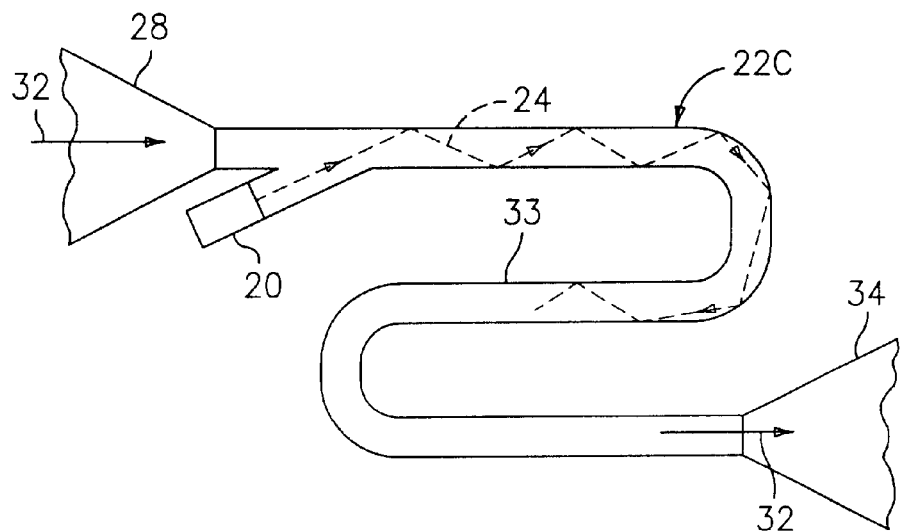
FIG. 10 shows in schematic cross section an alternative design cooling cell comprising a serpentine wave-guide tube.

FIG. 10 semi-schematically shows another design of cooling cell 22C which can be substituted for the cooling cell 22 of FIG. 8 and for cooling cells in other embodiments. The cell 22C comprises a serpentine combination optical wave guide 33 and gas channel for gas flowing along gas path 32 from the compressor 28 to expander 24. The light source 20, such as a laser, sends a beam 34 of light radiation reflecting along the interior of serpentine tube 33. The tube length is chosen according to the nature of the gas and radiation beam and the velocity of the gas, in accord with principles illustrated in the various other parts of this description. The beam may alternatively be made to travel in a direction opposite to the direction of gas flow, and more than one light source may be used, if desired. In the generality of the cooling cell, there are means for reflecting the beam inside the cell, to lengthen the beam path of travel through the working gas.

In special situations, the kinetic cooling effect can be used to augment prior art systems. For example, with reference to the reversed Brayton cycle schematically illustrated in FIG. 4, a cooling cell may be interposed between the expander and the cooling coil.

Figure 11:
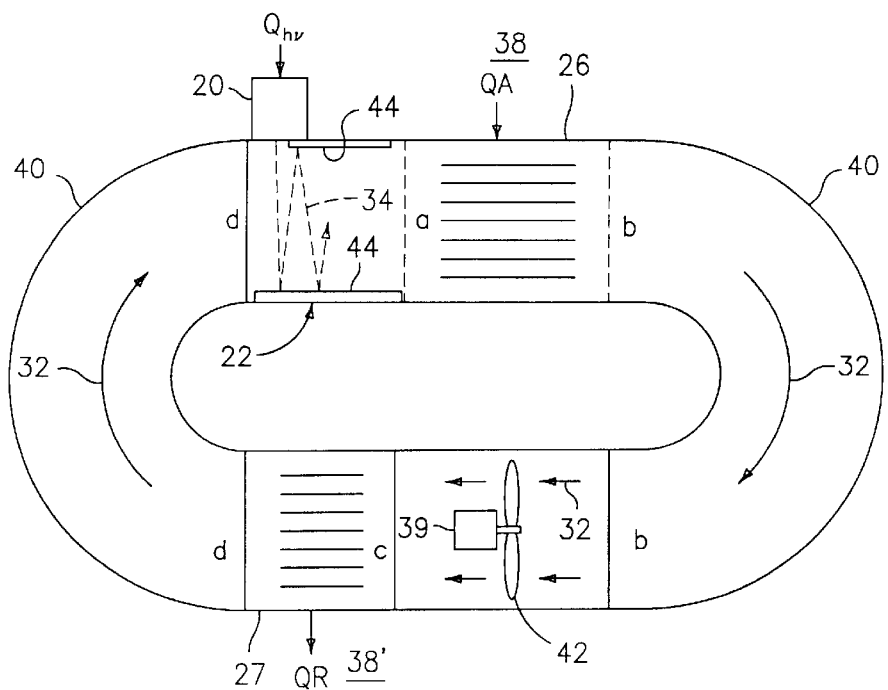
FIG. 11 semi-schematically shows an embodiment of the invention comprising a fan for circulating the working gas, and a waste heat exchanger.

FIG. 11 illustrates what we call a Type II cycle of the invention. The FIG. 11/Type II system/cycle is closed loop and in major parts like a Type I system/cycle. There is a fan or blower instead of the compressor of the FIG. 8 embodiment. In this description, a fan is distinguished from a compressor in that it has no positive or semi-positive displacement. Typically, a single stage fan is conceived for purposes herein to provide a pressure ratio of less than about 1.2. The FIG. 11 system operates at a low absolute pressure and low pressure ratio, compared to the Type I system. The interiors of the mechanical components are smoothly contoured in logical ways to minimize flow losses along flow path 32.

The preferred cooling cell 22 and laser of the exemplary FIG. 11 Type II apparatus are like those just described for FIG. 8 Type I system. Referring to FIG. 11, upon exiting the cooling cell 22 in cycle part d-a, the kinetically excited and cooled gas flows through a heat exchanger 26, where during cycle part a-b the gas is sensibly heated by transfer of heat QA from the environment 38. Fan 42, powered by a suitable motor 39, slightly pressurizes the gas in cycle part b-c, to cause the gas to move along the flow path 32. The gas is cooled as it flows through heat exchanger 27 in cycle part c-d, whereupon the thermodynamic cycle of the gas repeats.

In an example of use of the apparatus of the kind shown in FIG. 11, a 10% $CO_2$-90%$N_2$ gas at 0.1 atmosphere is used. The 10.6 micron $CO_2$ laser is operated as previously described. Adjusting for pressure (within the concept of FIG. 2), the lifetime of the excited $CO_2$ molecule, $T_{21}$, is about 1 millisecond. The gas flows at a velocity of about 40 m/s. The length of the cooling cell and heat exchanger together is equal to $0.25(\tau_{21})(v)$ or about 10 cm.

By operating the apparatus at a pressure below atmospheric, the homogeneous line width is altered, but the coefficient of absorption is unchanged, and τ21, being inversely proportional to pressure, becomes much longer. For instance, with a mixture of 1% $CO_2$ and 99%$N_2$ at a pressure of 20 Torr, $\tau_{21}$ will be 38 times longer than it is at atmospheric pressure (760 Torr), or about 38 milliseconds. Therefore, the flow velocity may be reduced, in the foregoing example, to just over 1 m/s; or the flow velocity may be set between 1 m/s and 40 m/s, and the length of the components increased correspondingly.

The cooling cell 22 of FIG. 11 is preferably designed to provide about 1,700 laser beam mirror-reflections across the cooling cell, providing a laser beam path length of about 1,700×60 cm, or about 1,000 m, through the gas as it passes through the cell, to thereby engender good energy absorption. For the FIG. 11 apparatus, this results in a calculated 84% absorption of the applied laser power, assuming a conventional mirror reflectivity of 99.99%. Using Equation (2) above, the temperature change in the cooling cell is about 62° K.

The invention devices are particularly well suited for heating or heat pump type applications since kinetic cooling processes function independent of average cycle temperature (unless they incorporate liquefaction of a portion of the working gas, as mentioned below). In this respect, they compare favorably to the known limitations of reversed Brayton cycle systems, in particular the limitations of Freon™ filled heat pump systems when the exterior atmosphere temperature lowers to much.

Figure 15:
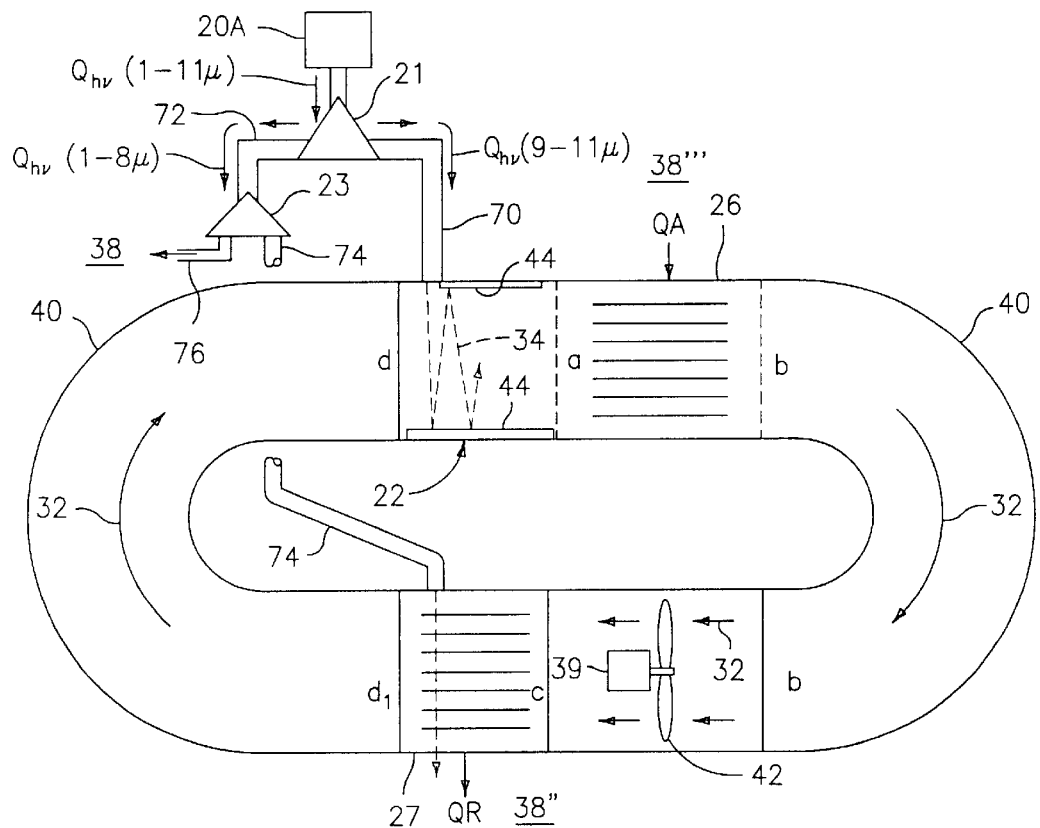
FIG. 15 shows an embodiment of the invention which is useful for pumping heat, to raise the temperature of the environment within a space.

FIG. 15 shows an example of a heat pump system, useful for warming the interior space 38" of a dwelling. The majority of the components and their essential function are as described in FIG. 11. The working gas choices are as detailed elsewhere herein. The working gas flows along path 32 in a clockwise direction, in the Figure. Heat from the exterior heat-reservoir environment 38''' is added to the working gas in the heat exchanger 26. Typically, environment 38''' will be atmospheric air or a body of natural water. The heated gas is moved by the fan 42 to heat exchanger 27, where it is transferred to the space 38" being heated. The gas then travels to cooling cell 22, where it is cooled. The cooling creates a significant temperature differential in the working gas and environment 38''', thus encouraging flow of heat from the environment at exchanger 26. As the working gas flows from exchanger 26, toward the fan and heat exchanger 27, the gas relaxes and thereby becomes further heated from the effects of $Q_{hv}$. As the hot gas passes through the heat exchanger 27, heat QR is transferred to the interior space 38".

In the FIG. 15 apparatus, light is split into different bands and the bands are selectively used to enhance the heating effect. The light source 20A may be a black body which supplies a broad band of light, $Q_{hv}$ in the range 0.5–14 microns. (Such light sources are discussed below.) The light is delivered to optical splitter 21. The 9–11 micron fraction of the light band is delivered along light conduit 70 (such as a glass fiber optic line) to the cooling cell 22, for kinetic cooling. The 1–8 micron fraction is delivered along light conduit 72 to a gate 23. In normal heating operation, gate 23 sends the otherwise-wasted 1–8 micron fraction of light down conduit 74, to heat exchanger 27. At the heat exchanger, the waste light is converted to heat (such as by impinging it on an absorber material); and, it is then transferred to the interior space 38" which is being heated, along with the heat from the heat exchanger.

The reason for the gate 23 will be appreciated in that the FIG. 15 apparatus may be alternately used for cooling, by suitably changing the flow of interior/exterior space air which flows through the heat exchangers 26, 27, to cause the FIG. 15 apparatus to function with respect to said spaces like the FIG. 11 apparatus. When this is done, it may be more convenient to dump the 1–8 micron light directly to a heat sink comprising environment 38 by adjusting gate 23, to lessen the load on heat exchanger 27, particularly if the waste heat-receiving environment 38" happens to rise in temperature, as does atmospheric air, during times when the cooling effect is wanted. In the alternative, the 1–8 micron radiation is retained in the light source containment, so as to reduce the electrical power (thermal input) necessary to drive the light source.

It is well known for reversed Brayton cycles systems to be operated in cascade fashion, to achieve very low temperatures. The systems of the present invention can be operated likewise in cascade fashion. As an example, the working substance in a second system is first cooled by heat exchange from the kinetically cooled working substance of a first system; the effect of the second system on the working substance is added, to achieve very low temperatures. Since the systems of the present invention can use effectively gas combinations which have low liquefaction temperatures, compared to the familiar ammonia or Freon™ gases of reversed Brayton cycles, the problems which occur in cascade systems due to liquefaction are not encountered so quickly.

Figure 12:
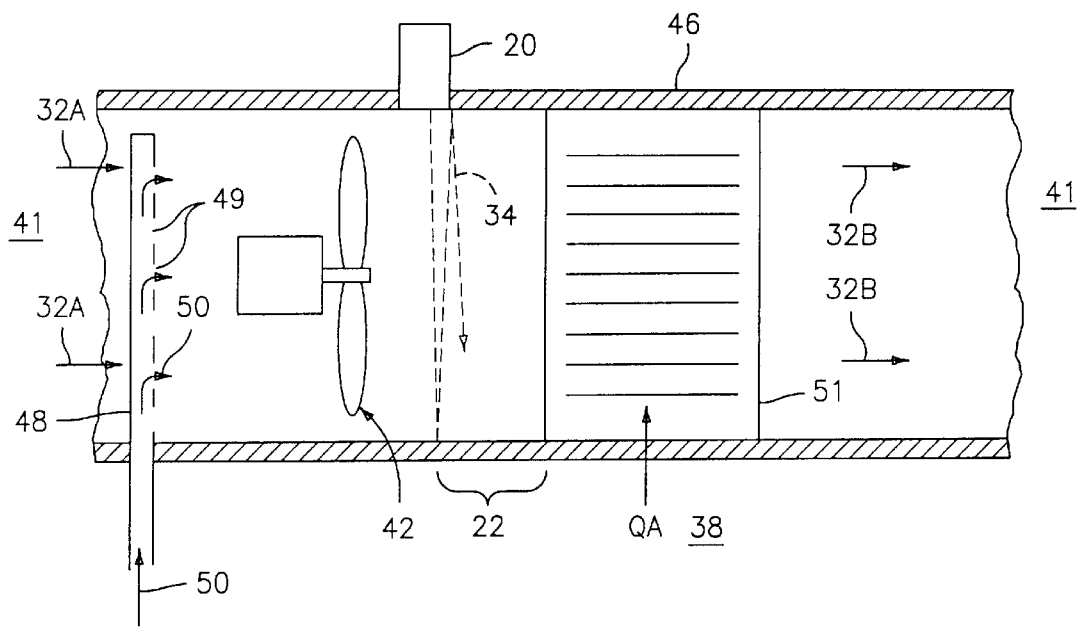
FIG. 12 semi-schematically shows open-loop apparatus of the invention, with means for adding supplemental vibrationally excitable gas such as carbon dioxide.

FIG. 12 semi-schematically illustrates an open cycle, or open-end device, namely an air conditioner or air cooling cell, which uses atmospheric air. It exemplifies what is called herein a Type III device. The air or other gas which is discharged to the environment rather than being internally contained and directly recirculated. The FIG. 12 device is optionally run in one of two modes: without and with addition of supplemental carbon dioxide or other gas which is easily excitable compared to the preponderant gas, e.g., nitrogen. In the generality of the invention, an additive, which is preferably a gas but may be some other substance, provides the working gas (air, in the example) with increased capacity for being kinetically cooled.

The FIG. 12 apparatus is comprised of a duct 46. Air from a first environment 41 is drawn by fan 42 into the duct, as indicated by arrows 32A. The air flow 32A may alternatively be induced in other ways than by a fan, such as by a ram effect or external gas mover. Extending across the entrance to the duct is a means for intermixing an additive into the gas which comprises the working substance; in particular, the apparatus is comprised of additive gas insertion pipe 48 having gas discharge openings 49. Pipe 48 enables injection of a supplemental gas such as $CO_2$ into the air flow, as indicated by the supplemental gas flow arrows 50. As the mixture of first environment gas and any supplemental gas flows downstream, it is irradiated and cooled at cell 22 by the beam 34 emanating from the 10.6 micron laser 20. As the gas flows through heat exchanger 51, heat is drawn from a second environment 38 which is being cooled. The gas then flows from the exit of the device as indicated by the arrows 32B, returning to the first environment 41, carrying with it the waste heat.

Calculated data follow which are intended to conceptually illustrate the operation of the FIG. 12 embodiment of the invention without any additive gas. The data are nominal since they are based on published data for $CO_2$–$N_2$ mixtures, and not the $CO_2$–$N_2$–$O_2$ mixture which comprises air. The cooling cell 22 is 2.5 cm in length and it has 900 square cm cross section. The heat exchanger length is about 10 cm. In a first example, the working gas is normal or standard atmospheric air, containing 440 ppm (parts per million) $CO_2$ The absorption coefficient $\alpha$ is about $2\times10^{-6} cm^{-1}$ at about 300° K, the assumed inlet temperature in this example. The system operates at essentially atmospheric pressure. The 10.6 micron beam has 3,300 j/s power. Ideal mirrors are assumed to have reflectivity of 99.999%, to reduce absorption losses at the mirrors to 7% of the beam energy. The laser beam traverses the cell about 6,700 times through the gas flowing at about 20 m/s. The relaxation time $\tau_{21}$ for the enriched air is about 0.045 seconds. Using Equation (2), the calculated temperature drop in the cooling cell is about 26° K.

The operation of the FIG. 12 Type III device is augmented when the $CO_2$ content of the working gas is enhanced by injection of $CO_2$ through the insertion pipe 48 during operation. For example, when the $CO_2$ content is increased to about 40,000 ppm (4%), $\tau_{21}$ of about 50 microseconds results. When using cooling cell and heat exchanger dimensions, and a laser, as described just above, gas velocity is higher at 100 m/s, in view of the shorter $T_{21}$ relaxation time. If less than ideal mirrors are used, having a reflectivity of 99.99%, there is about 7% absorption of laser energy by the gas flowing through the cooling cell. From Eq. (2), the temperature drop in the cooling cell is 13° K.

For an exemplary augmented Type III device like that just described, operating in a first environment 41 which is essentially air, the exhaust gas stream of an internal combustion engine or the cathode flow field of a fuel cell could provide a convenient source of such supplemental $CO_2$. Thus, the Type III device can be used to conveniently cool the interior of an automobile or aircraft. Generalizing on this aspect of the invention, an open-end device uses kinetic cooling of a first working substance component, for example air, having a first degree of responsiveness to radiation which produces a kinetic cooling effect; and, an additive is intermixed with the first component. The additive, for example carbon dioxide, has a second degree of responsiveness to radiation and the kinetic cooling effect, greater than the first gas component. The activity or responsiveness of the working substance gas stream to the kinetic cooling effect is thus increased. Alternatively, unmodified effluent from the engine or fuel cell may be employed, subject to a diminishing utility thereof, if the content of carbon dioxide and any other kinetically coolable gases is too high.

Of course, even though widely used, lasers are still comparatively expensive devices in the context of common commercial refrigeration systems. Presently, commercial lasers of the type which would be usable in the examples of the invention cost about one US dollar per watt (j/s). There is promise of reduced cost in on-going laser development work, such as that related to using solid state diodes. Open cycle lasers present other possibilities.

In the alternative, for reduced cost in the present invention, it is feasible, and can be even advantageous in some applications, to use light sources other than lasers. For example, benefit is obtained by using a broad band light source rather than a one-wavelength laser source. This can be understood from the following, when comparing a 10.6 micron laser to a light source providing a band of radiation in the range 9–11 microns. When using 10.6 micron coherent laser radiation, carbon dioxide will undergo a single transition, namely the unitary 10.591 micron transition, being the P20 branch of the 001–100 transition. In comparison, impinging a 9–11 micron band of radiation on the same carbon dioxide causes it to undergo a multiplicity of vibrational transitions, in the realm of 80 transitions. Reference may be made to the publication "Atmospheric Effects of Radiative Transfer" published by SPIE (1979). See Table 2, CCAFS $CO_2$ Extinction Data, at page 48 of Volume 195. The Table 2 shows the multiplicity of possible transitions between 9 and 11 microns.

As indicated below, a composite gas will be preferably chosen for use with a wide-band radiation source. Thus, a preponderance of the wavelengths which comprise the band of impinged radiation will be absorbed by the gas through excitation, and not wasted as disruptive sensible heating. A desirable composite gas is comprised of two or more components; and, each component is adapted for primarily absorbing radiation at one or more wavelengths which is different from the primary wavelength absorbing characteristic of the companion component(s).

A source for the desired 9–11 micron light may comprise a high intensity electric arc discharge in atmospheric air or analogous gas. For example, a carbon arc light source may be used. Another source may be of the kind which is defined herein as a black body source—that is, a body which emits radiation as a result of its high temperature, such as a resistance heated Globar™ silicon carbide rods or tungsten heating elements, or the Sun. Of course, most such light sources will typically emit radiation outside the desirable 9–11 micron range, for instance in the 4–5 micron range. If such undesirable radiation enters the cell it will be substantially ineffective in causing the desired change in vibrational energy level of the gas molecules and the kinetic cooling effect, and may induce undesirable sensible heating of the gas. Therefore, light from the wide spectrum source is preferably passed through a specially tailored 9–11 micron filter or a commercial band pass infrared interference filter centered on 9.7 micron. The filter preferably reflects back the unwanted radiation toward the source, so the energy requirement for keeping the source at its elevated temperature is reduced. Less preferably, the filter absorbs or diffuses the unwanted ineffective radiation; all to prevent it from entering the cooling cell. Generally, for the invention, a filter is any device which selectively enables some radiation wavelengths to enter the cooling cell while excluding other wavelengths.

Figure 13:
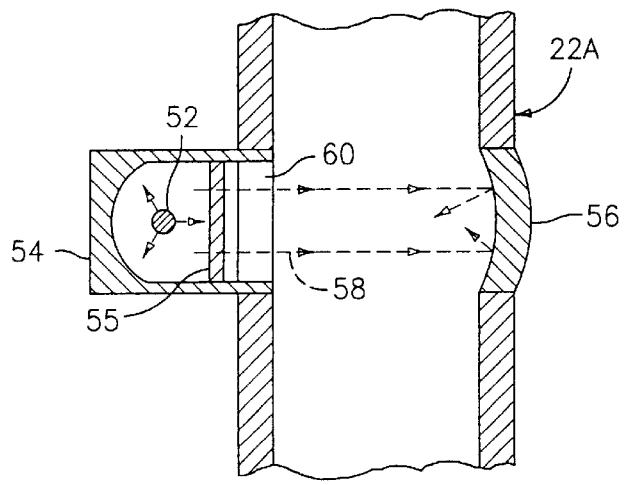
FIG. 13 semi-schematically shows a cooling chamber wherein a tungsten filament light source in cooperation with a mirror imparts radiant energy to the gas.

FIG. 13 shows a portion of a cooling cell 22A illustrating an example of such a multi-wavelenth wavelength light source and cooling cell. A suitable source of 9–11 micron light, such as a heated tungsten filament 52 (contained within a suitable unshown protective atmosphere and/or glass envelope) is placed within a concave mirror 54, exterior of the cooling cell. Radiation, indicated by arrows 58, from the filament passes directly and by reflection from mirror 54 through 9–11 micron filter 55 and through window 60 toward opposing-wall concave mirror 56 of the cooling cell which causes the radiation to be reflected back through the gas stream. The light will desirably be caused to reflect around the interior of the cooling cell by more complex mirror systems, consistent with the prior discussion and the goals relating to laser sources. The mirrors and window are conventional materials used in the field of laser technology. Commercial gold coated, or dielectrically coated mirrors have high reflectivity in the 9–11 micron range, and can approach 99.999% reflectivity.

Figure 14:
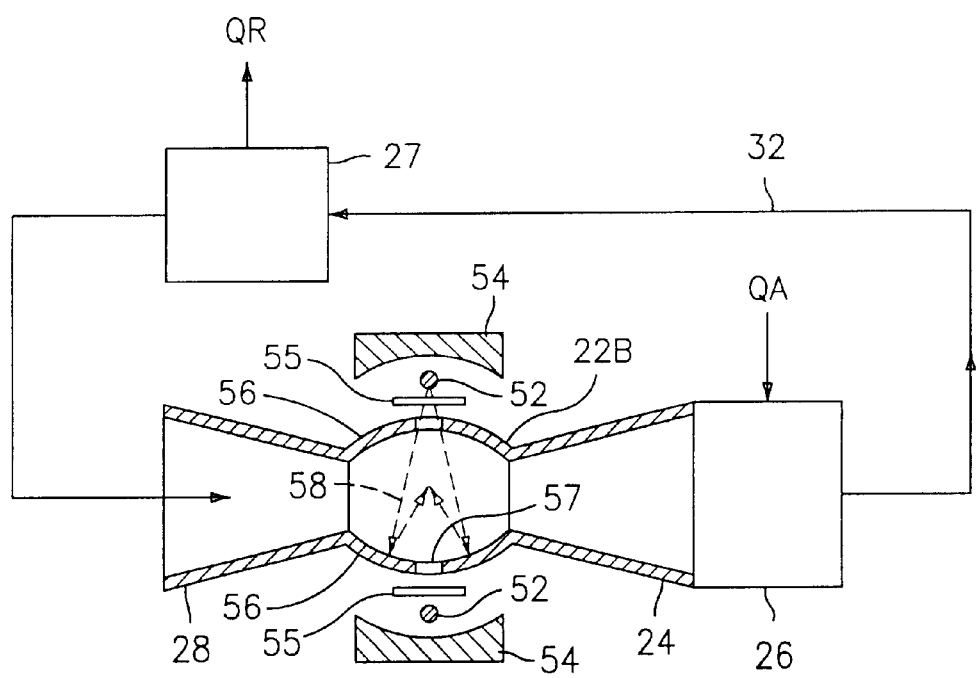
FIG. 14 semi-schematically shows an embodiment of the invention which comprises a more complex cooling cell using the same principles as the cell of FIG. 13.

FIG. 14 shows a cooling cell 22B which is part of apparatus which is discussed below. The cooling cell is somewhat like that just described, and comprises two opposing energy sources, namely filaments 52 on either side of the cell. Each filament has an associated focusing mirror 54. The tungsten filaments 52 deliver light over 9–11 microns to the interior of the cooling cell by means of filters and windows which are not shown but which have just been described. The opposing side concave mirrors 56 of the cell have windows 57 for entry of the filament radiation which is fragmentarily indicated by arrows 58. The light is reflected many times between the mirrors 54 and 56 as suggested by the arrows.

Another suitable wavelength-band light source is solar radiation, which may be shined directly on the cooling cell window, or which may be concentrated there by means of focusing devices. In the wavelengths greater than about one micron, solar radiation provides a useful energy profile similar to that provided by an about 3600° K black body, e.g., a tungsten filament. When sunlight is directly impinged on the cooling cell, it is estimated that a reasonably sized cooling cell window of about 1500 square cm will be required for an about 3,300 j/s Type III air conditioner. A suitable filter will also preferably be employed with the Sun as source. Thus, a means for providing suitable radiation may comprise means for directing filtered or unfiltered sunlight or other radiation to the cooling cell.

In the generality of the invention described thus far, a working gas is one which is kinetically coolable; that is, it responds to radiation by becoming excited and lowering in temperature. A kinetically coolable working gas may have one or more component which is preferentially excitable by the imposed radiation. In the examples, a kinetically coolable working gas is a mixture which is comprised of a combination of diatomic and one or more triatomic gases. The exemplary triatomic gas is of the kind which is preferentially kinetically coolable by the applied radiation wavelengths, whereas the diatomic gas is not significantly excited by the radiation. The working gas mixtures which have been described include (a) nitrogen with carbon dioxide; (b) air, preferably containing triatomic gas, e.g., carbon dioxide, in greater fraction than in nature; and (c) a mixture of nitrogen, nitric oxide, nitrous oxide and carbon dioxide. Other analogous combinations will present themselves. For example, oxygen may substitute for nitrogen.

Other unique gas mixtures are useful as the working substance. In particular, the capacity for absorption by the working gas of radiation, in either narrow or broad band, is increased by using certain mixtures of gases other than the $N_2$ and $CO_2$, the combinations prevalently mentioned above. In one such approach, the mixture is comprised of a first chemical composition gas and a second chemical composition gas, wherein the second gas has one or more vibrational transitions which are intermediate the transitions of a first gas. The term "chemical composition" is used interchangeably with "molecular composition" herein. For example, when using a 10.6 micron laser source and a gas which is preponderantly nitrogen, nitrogen dioxide may be used as a third gas in combination with carbon dioxide as a second gas. The P20 branch of the 001–100 transition of $NO_2$ occurs at 10.56 microns, which is intermediary the P16 and P18 transitions of $CO_2$(10.551 and 10.571 microns respectively), and thus the energy absorption of the combination of gases will be greater than the absorption of the carbon dioxide alone with nitrogen.

In another aspect of the invention, use is made of a mixture of at least two isotopic species of the same essential chemical composition gas. That is, each gas will be composed of identical elements. However, each gas will have a different atomic number. For example the working substance may comprise preponderantly nitrogen gas in combination with a first carbon dioxide gas comprised of the elemental isotope $C^{13}$, in further combination with a second carbon dioxide gas formed of $C^{12}$ isotope.

In each of the two foregoing types of gas mixture alternatives, one involving chemically different gases and the other isotopically different species of the same elementary composition gas, the second gas absorption wavelength is shifted slightly from that of the first. But the gases are chosen so that there is close resonance with the $N_2$, so that cooling will occur on a $\tau_{10}$ time scale and heating will occur on $\tau_{10}$ to $\tau_{21}$ time scale. Obviously, it is possible to combine the isotope-gas concept with the different chemical composition gas concept. In the generality of this aspect of the invention, a gas mixture is comprised of two or more gas components, where each gas component has one or more kinetic cooling wavelength transitions which are not shared by the other gas. Such a gas is referred to herein as a composite refrigerant gas. The principles for using composite refrigerant gas have thus far been illustrated for a laser source. It will be evident that a composite refrigerant gas may also be used in combination with a broad band (e.g., 9–11 micron) source, where the absorption for each gas species is at a multiplicity of wavelengths.

FIG. 14 schematically illustrates still another example of a Type II cycle apparatus. The apparatus uses the cooling cell 22B of the filament type, previously described. Gas flows along gas path 32 through a compressor 28 into the cooling cell 22B, through the expander 24; into the heat exchanger 26 where energy QA is transferred from the matter being cooled to the gas; then through heat exchanger 27 where energy QR is transferred from the gas to a heat sink; and, then back to the compressor. The cycle is essentially the same as that just described for FIG. 11 example. The working gas is comprised of an isotopic mixture or some or all of $NO_2$, $N_2O$, $CO_2$ and $N_2$; the more isotope species the better. Each of the triatomic gases is comprised of two isotopic species. The features of the filament source and working gas have been described in the example immediately above. The mirrors are highly efficient, like those previously described and the cooling cell configuration enables the working gas to absorb a high percentage of the applied light energy $Q_{hv}$. Filters 55 ensure that substantially only that useful portion of the light source radiation enters the interior of the cell 22B. In optimal performance mode, the combination of source and gas provides about 1000 absorption lines in the gas between 9 and 11 microns.

In real devices, where there are inevitable losses, calculations suggest that an optimal device having good efficiency results when a broad band source is used in combination with a composite gas. For example, a broad band light source can be expected to deliver a large fraction of the input electric energy to the cooling cell interior where it will be absorbed, for a net efficiency of about 80%. The thermodynamic cycle losses are expected to be about 10%. The resultant system efficiency is projected to be of the order of 60%.

Optimally configured apparatuses and cycles of the invention provide Coefficients Of Performance (COP) which are substantially greater than provided in prior art refrigeration apparatuses and methods. COP is calculated by dividing the amount of energy QA removed from the thing being refrigerated by the amount of energy input to the system to operate it. Calculations indicate a COP which is greater than the order of COP of about 3 which is characteristic for domestic air conditioners.

Another embodiment of the invention which can be useful is one in which the $CO_2$ is caused to liquefy or condense. For instance, the working substance may be 1% $CO_2$, 1% $NO_2$, 98% $N_2$, preferably with isotopic species being present. The system pressure will range between 690–6,980 kPa (about 7–70 atmosphere). The light source may be 9–11 micron light. The $CO_2$ will condense during the kinetic cooling step, and it can be extracted and vaporized for cooling, as in conventional reversed Brayton cycle, using suitable supplemental equipment.

To summarize what ought to be understood from the foregoing, the closed loop invention apparatus may be conveniently used in substitution of a conventional air conditioner, for cooling matter such as the air of a building or chamber, or for cooling some other space or heat transfer medium. The air or other thing to be cooled is cooled at the first heat exchanger. There is a heat sink for receiving the thermal energy which is transferred from the working substance gas by means of the second heat exchanger. In another application or mode of operation, the apparatus is used in substitution of a conventional heat pump, for heating matter such as the air of a building or chamber, etc. There is a heat reservoir, such as atmospheric air or ground water, for providing thermal energy or heat. Heat is transferred to the working substance gas from the heat reservoir by means of the first heat exchanger. Heat is transferred to the matter from the working substance gas at the second heat exchanger. The open-end kinetic cooling apparatus which has been described is principally conceived of as being useful for cooling use, but it will be evident that the discharge of working gas from the apparatus can also be employed for heating.

While the invention examples have been described in terms of particular gases and particular wavelengths of light, the concept of the invention may be employed with other working substances, extant and to be discovered, and may include liquids. In the broad generality of the invention, a working substance is one which responds at a molecular level to a radiation source by becoming excited, so that the radiation causes a significant number of molecules of the working substance to transition to elevated energy levels which are characterized by substantial vibrational energy. Contemporaneously, other molecules of the substance which are initially at translational energy levels move to higher (vibrational) energy levels, to replenish the molecules which have been excited by radiation. Thus, a working substance may be a material which is kinetically cooled by means of electromagnetic radiation which is outside the conventional definition of light; and with such substance the appropriate electromagnetic radiation source will be used.

In the generality of the invention, irradiation of a working substance at any given wavelength may be achieved by irradiating the substance with a band of wavelengths which include the given wavelength. Thus, the term "wavelength" has been defined to include a narrow band of wavelengths, at least one of which is absorbable by a working substance in a way which engenders the desired excitation and cooling. And, the term also comprehends broad bands of wavelengths for contemporaneously exciting working substances which are comprised of molecularly or isotopically different compositions of matter.

Although this invention has been shown and described with respect to exemplary embodiments, it will be understood by those skilled in this art that various changes in form and detail thereof may be made without departing from the spirit and scope of the claimed invention.

We claim:

1. A method for cooling matter which method comprises:
   (a) flowing a working substance which is a fluid along a flow path;
   (b) kinetically cooling the flowing working substance by irradiating the working substance with electromagnetic radiation; and
   (c) transferring heat from the matter to the kinetically cooled working substance as the working substance flows along the flow path.

2. A method for cooling matter which comprises:
   irradiating, with electromagnetic radiation of a particular wavelength, a flowing substance which is a fluid having a property of becoming kinetically cooled in response to irradiation by electromagnetic radiation of the particular wavelength, to thereby kinetically cool the substance; and,
   flowing the substance past the matter so that heat transfers from the matter to the kinetically cooled flowing substance.

3. A method of claim 1 or 2 wherein the working substance is a gas which is at least in part a liquid at a point along the flow path.

4. The method according to claim 1 or 2 wherein said step of flowing comprises: moving said working substance by means of a fan.

5. The method according to claim 1 or 2 wherein said step of flowing comprises: moving said working substance by means of a compressor.

6. The method of claim 1 or 2 wherein the working substance is a gas.

7. The method according to claim 6 wherein gas is continuously recirculated past the matter, and wherein said step of flowing comprises:
   compressing the gas after the gas flows past the matter; and,
   expanding the gas after the gas is irradiated and before the gas flows past the matter.

8. The method according to claim 6 wherein the flow path is open-ended and said gas is dispersed into the environment after flowing past the matter to be cooled.

9. The method according to claim 6 wherein said gas predominantly comprises gas ingested from the environment.

10. The method according to claim 9, further comprising:
    introducing an additive into the ingested gas upstream of the point along the flow path where the gas is irradiated.

11. The method according to claim 6 wherein said gas comprises exhaust gas of an internal combustion engine or a fuel cell.

12. The method according to claim 11 wherein said exhaust gas of an internal combustion engine or a fuel cell comprises a minor fraction of said working substance gas.

13. The method according to claim 6 wherein the matter is in heat transfer communication with the atmosphere of a confined space.

14. The method according to claim 6 wherein said matter comprises a first portion of a first heat exchanger; and further comprising:

flowing a fluid being cooled through a second portion of said first heat exchanger which
is in heat transfer communication with said first portion.

15. The method according to claim 14 further comprising:
flowing said gas through a first portion of a second heat exchanger downstream of said first heat exchanger; and
flowing a cooling fluid through a second portion of said second heat exchanger which is in heat-transfer communication with said first portion of the second heat exchanger.

16. The method of claim 15 wherein the flowing step comprises continuously circulating said gas in a closed loop.

17. The method of cooling the air atmosphere of a confined space, according to the method of claim 15, wherein, said atmosphere is the fluid which flows through said second portion of said first heat exchanger; and,
wherein, said second heat exchanger removes heat from said gas, to transfer said heat to liquid or gas heat sink.

18. The method of heating the air atmosphere of a confined space, which comprises the method of claim 15, wherein said air atmosphere is said cooling fluid; and, wherein a heat-source liquid or gas flows through said second portion of said first heat exchanger.

19. The method according to claim 6 wherein said gas is irradiated with radiation from either a laser, a hot body, an electric arc, or a means for directing solar radiation.

20. The method according to claim 19 wherein said gas is irradiated using a $CO_2$ laser or a pulsed laser.

21. The method according to claim 6 wherein said gas is irradiated with substantially constant intensity radiation or with pulsed radiation.

22. The method according to claim 6 wherein said gas is irradiated with a band of wavelengths.

23. The method according to claim 22 wherein said band comprises the wavelength range between 9 microns and 11 microns.

24. The method according to claim 23 which further comprises: filtering radiation from a source which provides radiation wavelengths which lie both within and without the range of said band, so that predominately only said band of wavelengths irradiates said gas.

25. The method according to claim 6 wherein said gas comprises a mixture of at least two component gases, each component gas kinetically coolable by a corresponding radiation wavelength which does not substantially cool any other component gas; and, wherein, said gas is irradiated by at least two of said corresponding radiation wavelengths.

26. The method according to claim 25 wherein said gas comprises component gases having molecular compositions which are different from each other.

27. The method according to claim 25 wherein said gas comprises component gases which are different isotopic gas species having the same molecular composition.

28. The method according to claim 25 wherein said gas comprises component gases which are triatomic gases having different molecular compositions.

29. The method according to claim 6 wherein said gas includes a first component gas comprised predominantly of nitrogen or oxygen, and a second component gas selected from carbon dioxide, nitrous oxide, nitric oxide, and mixtures thereof.

30. The method of claim 29 wherein said gas comprises nitrogen and carbon dioxide.

31. A method of transferring heat, which comprises:
flowing gas along a flow path;
channeling the flowing gas through a cooling cell located along the flow path while irradiating the gas with electromagnetic radiation; transferring heat from matter to be cooled in a first heat exchanger located along the flow path downstream from the cooling cell.

32. A method of transferring heat from matter, comprising:
(a) flowing gas along a gas flow path past matter which is to be cooled, said gas having the property of becoming kinetically cooled when irradiated by electromagnetic radiation; and,
(b) irradiating said gas with said electromagnetic radiation within a cooling cell located along the flow path, prior to flowing said gas past the matter.

33. Apparatus for cooling matter which method comprises:
(a) means for flowing a working substance which is a fluid along a flow path;
(b) means for kinetically cooling the flowing working substance by irradiating the working substance with electromagnetic radiation; and
(c) means for transferring heat from the matter to the kinetically cooled working substance as the working substance flows along the flow path.

34. Apparatus for transferring heat, which comprises:
means for flowing gas along a flow path;
a cooling cell, located along the flow path, for channeling the flowing gas, within which the gas is irradiated with electromagnetic radiation;
a first heat exchanger, located along the flow path downstream of said cooling cell, for transferring heat from matter to be cooled.

35. The apparatus of claim 34, further comprising:
a second heat exchanger, located downstream along the flow path from said first heat exchanger and upstream of said cooling cell, for removing heat from said gas.

36. Apparatus for transferring heat from matter, comprising:
(a) means for flowing gas along a flow path past matter which is to be cooled, said gas having the property of becoming kinetically cooled when irradiated by electromagnetic radiation; and,
(b) a cooling cell, located along the flow path, within which said gas is irradiated with said electromagnetic radiation prior to flowing said gas past the matter.

37. The apparatus of claim 36 wherein said means for flowing comprises a fan or a compressor.

38. The apparatus of claim 36 wherein said means for flowing comprises a compressor; and further comprising:
an expander located along the flow path downstream of and adjacent to said cooling cell.

39. The apparatus of claim 36 wherein the flow path is open ended and said gas is discharged into the environment of said apparatus after flowing past said matter.

40. The apparatus of claim 36 wherein said gas comprises gas which is continuously provided to the apparatus from a source external to the apparatus.

41. The apparatus of claim 40 wherein said external source is the ambient atmosphere of the earth.

42. The apparatus of claim 40 wherein said means for flowing draws said gas from the external source into the apparatus.

43. The apparatus of claim 40 further comprising:
means for intermixing an additive with said gas prior to the gas flowing into said cooling cell.

44. The apparatus of claim 40 wherein said external source of gas comprises the exhaust stream of an internal combustion engine or a fuel cell.

45. The apparatus of claim 36, wherein said matter is a first heat exchanger which transfers heat to the gas, further comprising: a second heat exchanger disposed along the flow path downstream of said matter, for removing heat from said gas.

46. The apparatus of claim 45 wherein the flow path is a closed loop.

47. The apparatus of claim 36, for use in cooling second matter external to the apparatus, further comprising: means, located downstream of the cooling cell along the flow path, for transferring heat from said second matter to the matter first mentioned above, and thence to the gas, to thereby cool said second matter.

48. The apparatus of claim 36, for use in heating second matter external to the apparatus, further comprising: means, located along the flow path downstream of the matter first mentioned above, for transferring heat from said gas to said second matter.

49. The apparatus of claim 36 further comprising:
an energy source, for providing said electromagnetic radiation to the cooling cell.

50. The apparatus of claim 49 wherein said source is selected from the group comprising a laser, a hot body, an electric arc, and means for directing solar radiation.

51. The apparatus of claim 49 wherein said source is a laser selected from the group which comprises a $CO_2$ laser and a pulsed laser.

52. The apparatus of claim 49 wherein said source provides radiation of substantially constant intensity to said cooling cell.

53. The apparatus of claim 49 wherein said source provides pulsed radiation to said cooling cell.

54. The apparatus of claim 49 wherein said source provides a band of wavelengths to said cooling cell.

55. The apparatus of claim 49 wherein said source provides wavelengths in the range of nine microns to eleven microns.

56. The apparatus of claim 49 wherein said source provides electromagnetic energy over a band of wavelengths, some of which wavelengths are substantially ineffective for engendering kinetic cooling of the gas; and
a filter, interposed between said energy source and the interior of the cooling cell, for selectively preventing at least some of said substantially ineffective wavelengths from entering said cooling cell interior.

57. The apparatus of claim 49 wherein said energy source is located outside of the cooling cell; and, wherein the cooling cell comprises a window which transmits electromagnetic energy from the exterior of the cell to the interior of the cell.

58. The apparatus of claim 36 further comprising: means for reflecting radiant energy within the cooling cell so that electromagnetic radiation being impinged on the gas is reflected about within the cell.

59. The apparatus of claim 36 which further comprises: a kinetically coolable gas, for flowing along the gas flow path.

60. The apparatus of claim 59 wherein said gas comprises a mixture of at least two component gases, each component gas kinetically coolable by a corresponding radiation wavelength which does not substantially cool another one of said component gases; and, wherein, said gas is irradiated by at least two of said corresponding radiation wavelengths.

61. The apparatus of claim 60, further comprising:
a source for providing a plurality of said corresponding wavelengths to said cooling cell.

62. The apparatus of claims 60, wherein said gas comprises component gases having molecular compositions which are different from each other.

63. The apparatus of claims 60, wherein said gas comprises component gases which are different isotopic gas species having the same molecular composition.

64. The apparatus of claim 60, wherein said at least two component gases are triatomic gases having different molecular compositions.

65. The apparatus of claim 59 wherein said gas comprises nitrogen and carbon dioxide.

66. The apparatus of claim 59, wherein said gas includes a first component gas comprised predominantly of nitrogen or oxygen, and a second component gas selected from carbon dioxide, nitrous oxide, nitric oxide, and mixtures thereof.

67. Air conditioning apparatus, for cooling the air of a confined space, comprising:
a kinetically coolable working substance which is a fluid;
means for continuously flowing the working substance along a closed loop flow path;
a cooling cell, located along the flow path, within which the working substance is to be kinetically cooled;
a heat exchanger, located along the flow path downstream from the cooling cell, for transferring heat from said atmosphere to the working substance;
a second heat exchanger, located along the flow path downstream from the first heat exchanger, for transferring heat from the working substance to a location external to the apparatus; and,
a radiation source, for providing to the cooling cell electromagnetic radiation which kinetically cools the working substance.

68. Heat pump apparatus for heating the air in a confined space, using heat removed from a fluid which is in a region external to the confined space, comprising:
a kinetically coolable working substance which is a fluid;
means for continuously flowing the working substance along a closed loop flow path;
a cooling cell, located along the flow path, for channeling flowing working substance while it is being kinetically cooled;
a first heat exchanger, located along the flow path downstream from the cooling cell, for transferring heat from said fluid;
a second heat exchanger, located along the flow path downstream from the first heat exchanger, for transferring heat from the working substance to said atmosphere; and,
a radiation source, for providing to the cooling cell electromagnetic radiation which kinetically cools the working substance.

69. The apparatus of claim 68 wherein said fluid is the atmosphere of the earth.

70. A method for cooling subject matter, comprising:
flowing gas past subject matter to be cooled, the gas having molecules which are responsive to radiation of at least one electromagnetic radiation wavelength, so that the radiation raises the energy level of a first portion of the molecules from a first non-translational energy level to a second non-translational energy level; and, the gas further having a second portion of the molecules, substantially equal in number of molecules to the number of molecules in said first portion, which second portion of molecules rise from a translational energy level to said first non-translational energy level in relation to said change in energy level of the first portion; said changes in molecule energy levels thereby kinetically cooling said gas; and subjecting the gas to said at least one electromagnetic radiation wavelength, upstream of said subject matter, thereby to kinetically cool said gas.

71. The method of claim 70 wherein the gas flows past said subject matter prior to substantial relaxation of molecules in said first portion from said second energy level.

72. The method of claim 70 wherein the gas is maintained at a pressure substantially below atmospheric pressure.

73. The method of claim 72 wherein the gas is maintained at a pressure of about 20 Torr.

* * * * *